United States Patent
Alazmi et al.

(10) Patent No.: US 10,995,003 B2
(45) Date of Patent: May 4, 2021

(54) GRAPHENE MATERIALS AND IMPROVED METHODS OF MAKING, DRYING, AND APPLICATIONS

(71) Applicant: KING ABDULLAH UNIVERSITY OF SCIENCE AND TECHNOLOGY, Thuwal (SA)

(72) Inventors: Amira Salman Alazmi, Thuwal (SA); Pedro Miguel Da Costa, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 30 days.

(21) Appl. No.: 16/313,726

(22) PCT Filed: Aug. 1, 2017

(86) PCT No.: PCT/IB2017/054680
§ 371 (c)(1),
(2) Date: Dec. 27, 2018

(87) PCT Pub. No.: WO2018/033816
PCT Pub. Date: Feb. 22, 2018

(65) Prior Publication Data
US 2019/0169033 A1 Jun. 6, 2019

Related U.S. Application Data

(60) Provisional application No. 62/377,640, filed on Aug. 21, 2016, provisional application No. 62/375,852, filed on Aug. 16, 2016.

(51) Int. Cl.
C01B 32/198 (2017.01)
H01G 11/86 (2013.01)
(Continued)

(52) U.S. Cl.
CPC .......... *C01B 32/198* (2017.08); *C01B 32/182* (2017.08); *C01B 32/184* (2017.08);
(Continued)

(58) Field of Classification Search
CPC ... C01B 32/198; C01B 32/182; C01B 32/184; C01B 2204/32; C01B 2204/22;
(Continued)

(56) References Cited

U.S. PATENT DOCUMENTS

2012/0034442 A1  2/2012  Pauzauskie et al.
2013/0056036 A1  3/2013  Tousimis
(Continued)

FOREIGN PATENT DOCUMENTS

CN  104658770 A  *  5/2015
WO  2015069332 A1  5/2015

OTHER PUBLICATIONS

Booth, Tim J., et al. "Macroscopic graphene membranes and their extraordinary stiffness." Nano letters 8.8 (2008): 2442-2446.*
(Continued)

*Primary Examiner* — Richard M Rump
(74) *Attorney, Agent, or Firm* — Patent Portfolio

(57) ABSTRACT

The impact of post-synthesis processing in, for example, graphene oxid or reduced graphene oxide materials for supercapacitor electrodes has been analyzed. A comparative study of vacuum, freeze and critical point drying was carried out for graphene oxide or hydrothermally reduced graphene oxide demonstrating that the optimization of the specific surface area and preservation of the porous network is important to maximize its properties such as supercapacitance performance. As described below, using a supercritical fluid as the drying medium, unprecedented values of specific surface area (e.g., 364 $m^2\ g^{-1}$) and supercapacitance (e.g., 441 $F\ g^{-1}$) for this class of materials were achieved.

20 Claims, 19 Drawing Sheets

(51) Int. Cl.
   *H01G 11/24* (2013.01)
   *H01G 11/36* (2013.01)
   *C01B 32/182* (2017.01)
   *C01B 32/184* (2017.01)
   *H01G 11/32* (2013.01)

(52) U.S. Cl.
   CPC .............. *H01G 11/24* (2013.01); *H01G 11/36* (2013.01); *H01G 11/86* (2013.01); *C01B 2204/22* (2013.01); *C01B 2204/32* (2013.01); *C01P 2002/72* (2013.01); *C01P 2004/03* (2013.01); *C01P 2006/12* (2013.01); *C01P 2006/17* (2013.01); *C01P 2006/40* (2013.01); *H01G 11/32* (2013.01); *Y02E 60/13* (2013.01); *Y02P 20/54* (2015.11)

(58) Field of Classification Search
   CPC ........ H01G 11/36; H01G 11/24; H01G 11/86; H01G 11/32; Y02P 20/544; Y02E 60/13; C01P 2006/40; C01P 2006/17; C01P 2006/12; C01P 2004/03; C01P 2002/72
   See application file for complete search history.

(56) References Cited

U.S. PATENT DOCUMENTS

2013/0239996 A1    9/2013    Tousimis
2015/0079669 A1    3/2015    Huffstetler et al.
2015/0216162 A1    8/2015    Tousimis

OTHER PUBLICATIONS

Vickery, Jemma L., Avinash J. Patil, and Stephen Mann. "fabrication of graphene—polymer nanocomposites with higher-order three-dimensional architectures." Advanced Materials 21.21 (2009): 2180-2184.*

Liu, Ying, et al. "Highly conductive In—SnO 2/RGO nano-heterostructures with improved lithium-ion battery performance." Scientific reports 6 (2016): 25860.*

Zhong, Yayun, et al. "Supercapacitive behavior of electrostatic self-assembly reduced graphene oxide/CoAl-layered double hydroxides nanocomposites." Journal of Alloys and Compounds 669 (2016): 146-155.*

Li, Nanting, et al. "The synthesis of graphene oxide nanostructures for supercapacitors: a simple route." Journal of Materials Science 49.7 (2014): 2802-2809.*

Chabot, Victor, et al. "A review of graphene and graphene oxide sponge: material synthesis and applications to energy and the environment." Energy & Environmental Science 7.5 (2014): 1564-1596.*

Zhang, Xuetong, et al. "Mechanically strong and highly conductive graphene aerogel and its use as electrodes for electrochemical power sources." Journal of Materials Chemistry 21.18 (2011): 6494-6497.*

Wang, Hong Juan, et al. "Performance of fast thermally reduced graphene oxide for supercapacitor." Advanced Materials Research. vol. 785. Trans Tech Publications Ltd, 2013.*

Li, Cheng Chao, et al. "Green synthesis of highly reduced graphene oxide by compressed hydrogen gas towards energy storage devices." Journal of Power Sources 274 (2015): 310-317.*

Alazmi, A., et al., "Comparative study of synthesis and reduction methods for graphene oxide," Polyhedron, vol. 116, Sep. 25, 2016 (Available online May 14, 2016), pp. 153-161.

Antony, R.P., et al., "Efficient electrocatalytic performance of thermally exfoliated reduced graphene oxide-Pt hybrid," Materials Research Bulletin, vol. 70, Oct. 2015 (Available online Apr. 11, 2015), pp. 60-67.

Bai, Y., et al., "Effect of pH-induced chemical modification of hydrothermally reduced graphene oxide on supercapacitor performance," Journal of Power Sources, vol. 233, Jul. 1, 2013 (Available online Jan. 29, 2013), pp. 313-319.

Choi, H.-J., et al., "Graphene for energy conversion and storage in fuel cells and supercapacitors," Nano Energy, vol. 1, No. 4, Jul. 2012 (Available online May 15, 2012), pp. 534-551.

Ciesielski, W., et al., "Thermal properties of complexes of amaranthus starch with selected metal salts," Thermochimica Acta, vol. 403, No. 2, Jul. 28, 2003, pp. 161-171.

Dohnalkova, A.C., et al., "Imaging Hydrated Microbial Extracellular Polymers: Comparative Analysis by Electron Microscopy," Applied and Environmental Microbiology, vol. 77, No. 4, Feb. 2011 (Published ahead of print Dec. 17, 2010), pp. 1254-1262.

Du, M., et al., "Synthesis of nitrogen-doped reduced graphene oxide directly from nitrogen-doped graphene oxide as a high-performance lithium ion battery anode," RSC Advances, vol. 4, No. 80, 2014 (First Published Sep. 3, 2014), pp. 42412-42417.

Feng, X. (Editor), "Nanocarbons for Advanced Energy Storage," vol. 1, First Edition, Chapters 1-15, 2015 (First Published Mar. 20, 2015), 478 pages.

Gao, M., et al., "Green chemistry synthesis of a nanocomposite graphene hydrogel with three-dimensional nano-mesopores for photocatalytic $H_2$ production," RSC Advances, vol. 3, No. 32, May 13, 2013, pp. 13169-13177.

Granadeiro, C.M., et al., "Photoluminescent bimetallic-3-hydroxypicolinate/graphene oxide nanocomposite," RSC Advances, vol. 2, No. 25, Oct. 21, 2012 (First Published Aug. 3, 2012), pp. 9443-9447.

Hayes, W.I., et al., "Production of reduced graphene oxide via hydrothermal reduction in an aqueous sulphuric acid suspension and its electrochemical behaviour," J. Solid State Electrochem., vol. 19, No. 2, Feb. 2015 (Published online Aug. 21, 2014), pp. 361-380.

He, P., et al., "Reduced Graphene Oxide-$CoFe_2O_4$ Composites for Supercapacitor Electrode," Russian Journal of Electrochemistry, vol. 49, No. 4, Apr. 2013 (Published online Apr. 17, 2013), pp. 359-364.

Kumar, N.A., et al., "Polyaniline-Grafted Reduced Graphene Oxide for Efficient Electrochemical Supercapacitors," ACS Nano, vol. 6, No. 2, Feb. 28, 2012 (Published online Jan. 25, 2012), pp. 1715-1723.

Kumar, N.A., et al., "Synthesis of high quality reduced graphene oxide nanosheets free of paramagnetic metallic impurities," Journal of Materials Chemistry A, vol. 1, No. 8, Feb. 28, 2013 (First Published Nov. 23, 2012), pp. 2789-2794 (7 pages total).

Kumar, R., et al., "Microwave-assisted synthesis of void-induced graphene-wrapped nickel oxide hybrids for supercapacitor applications," RSC Advances, vol. 6, No. 32, 2016 (First Published Mar. 4, 2016), pp. 26612-26620.

Lalwani, G., et al., "Fabrication and characterization of three-dimensional macroscopic all-carbon scaffolds," Carbon, vol. 53, Mar. 2013 (Available online Oct. 24, 2012), pp. 90-100.

Li, D., et al., "Processable aqueous dispersions of graphene nanosheets," Nature Nanotechnology, vol. 3, No. 2, Feb. 2008 (Published online Jan. 27, 2008), pp. 101-105.

Li, Y., et al., "Catalytic performance of Pt nanoparticles on reduced graphene oxide for methanol electro-oxidation," Carbon, vol. 48, No. 4, Apr. 2010 (Available online Nov. 24, 2009), pp. 1124-1130.

Lim, H.N., et al., "Fabrication and characterization of graphene hydrogel via hydrothermal approach as a scaffold for preliminary study of cell growth," International Journal of Nanomedicine, vol. 6, 2011 (Published online Aug. 29, 2011), pp. 1817-1823.

Lin, Z., et al., "Superior Capacitance of Functionalized Graphene," J. Phys. Chem. C, vol. 115, No. 14, Apr. 14, 2011 (Published on the Web Mar. 14, 2011), pp. 7120-7125.

Low, Q.X., et al., "Facile structural tuning and compositing of iron oxide-graphene anode towards enhanced supacapacitive performance," Nano Energy, vol. 5, Apr. 2014 (Available online Jan. 31, 2014), pp. 28-35.

Luo, Z., et al., "Microwave-assisted solvothermal preparation of nitrogen and sulfur co-doped reduced graphene oxide and graphene quantum dots hybrids for highly efficient oxygen reduction," Journal of Materials Chemistry A, vol. 2, No. 48, Dec. 28, 2014 (First Published Nov. 5, 2014), pp. 20605-20611.

(56) References Cited

OTHER PUBLICATIONS

Ma, X., et al., "A Functionalized Graphene Oxide—Iron Oxide Nanocomposite for Magnetically Targeted Drug Delivery, Photothermal Therapy, and Magnetic Resonance Imaging," Nano Research, vol. 5, No. 3, Mar. 2012 (Published online Feb. 11, 2012), pp. 199-212.

Marcano, D.C., et al., "Improved Synthesis of Graphene Oxide," ACS Nano, vol. 4, No. 8, 2010 (Published online Jul. 22, 2010), pp. 4806-4814.

Nassar, M.Y., et al., "Hydrothermal synthesis of cobalt carbonates using different counter ions: An efficient precursor to nano-sized cobalt oxide ($Co_3O_4$)," Polyhedron, vol. 30, No. 15, Sep. 21, 2011 (Available online Aug. 3, 2011), pp. 2431-2437.

Park, S., et al., "Hydrazine-reduction of graphite- and graphene oxide," Carbon, vol. 49, No. 9, Aug. 9, 2011 (Available online Mar. 15, 2011), pp. 3019-3023.

Ramimoghadam, D., et al., "Hydrothermal synthesis of zinc oxide nanoparticles using rice as soft biotemplate," Chemistry Central Journal, vol. 7, No. 1, Article 136, Aug. 6, 2013, pp. 1-10.

Sawangphruk, M., et al., "High-performance supercapacitors based on silver nanoparticle-polyaniline-graphene nanocomposites coated on flexible carbon fiber paper," Journal of Materials Chemistry A, vol. 1, No. 34, Sep. 14, 2013 (First Published Jul. 12, 2013), pp. 9630-9636.

Schniepp, H.C., et al., "Functionalized Single Graphene Sheets Derived from Splitting Graphite Oxide," The Journal of Physical Chemistry B: Letters, vol. 110, No. 17, May 4, 2006 (Published on the Web Apr. 11, 2006), pp. 8535-8539.

Shi, W., et al., "Achieving high specific charge capacitances in $Fe_3O_4$/reduced graphene oxide nanocomposites," Journal of Materials Chemistry, vol. 21, No. 10, Mar. 14, 2011 (First Published Jan. 24, 2011), pp. 3422-3427.

Shin, H.-J., et al., "Efficient Reduction of Graphite Oxide by Sodium Borohydride and Its Effect on Electrical Conductance," Advanced Functional Materials, vol. 19, No. 12, Jun. 12, 2009 (Published online Apr. 20, 2009), pp. 1987-1992.

Song, Z., et al., "Hydrothermal synthesis and electrochemical performance of $Co_3O_4$/reduced graphene oxide nanosheet composites for supercapacitors," Electrochimica Acta, vol. 112, Dec. 1, 2013 (Available online Sep. 6, 2013), pp. 120-126.

Talbot, M.J., et al., "Methanol fixation of plant tissue for Scanning Electron Microscopy improves preservation of tissue morphology and dimensions," Plant Methods, vol. 9, No. 1, Article 36, Oct. 2, 2013, pp. 1-7.

Vermisoglou, E.C., et al., "Effect of hydrothermal reaction time and alkaline conditions on the electrochemical properties of reduced graphene oxide," Applied Surface Science, vol. 358, Part A, Dec. 15, 2015 (Available online Aug. 19, 2015), pp. 100-109.

Wang, H., et al., "$Mn_3O_4$-Graphene Hybrid as a High-Capacity Anode Material for Lithium Ion Batteries," J. Am. Chem. Soc., vol. 132, No. 40, Oct. 13, 2010 (Published on the Web Sep. 20, 2010), pp. 13978-13980.

Wang, X., et al., "Fabrication and characterization of graphene-reinforced waterborne polyurethane nanocomposite coatings by the sol-gel method," Surface & Coatings Technology, vol. 206, No. 23, 2012 (Available online Apr. 4, 2012), pp. 4778-4784.

Wong, C.P.P., et al., "Advanced Chemical Reduction of Reduced Graphene Oxide and Its Photocatalytic Activity in Degrading Reactive Black 5," Materials, vol. 8, No. 10, Oct. 19, 2015, pp. 7118-7128.

Xiao, Y., et al., "$CoFe_2O_4$-Graphene Nanocomposites Synthesized through an Ultrasonic Method with Enhanced Performances as Anode Materials for Li-ion Batteries," Nano-Micro Lett., vol. 6, No. 4, Oct. 2014 (Published online Sep. 13, 2014), pp. 307-315.

Xu, C., et al., "Fabrication and Characteristics of Reduced Graphene Oxide Produced with Different Green Reductants," PloS One, vol. 10, No. 12, e0144842, Dec. 14, 2015, pp. 1-15.

Yan, J., et al., "High-performance supercapacitor electrodes based on highly corrugated graphene sheets," Carbon, vol. 50, No. 6, May 2012 (Available online Jan. 14, 2012), pp. 2179-2188.

Yan, J., et al., "Template-Assisted Low Temperature Synthesis of Functionalized Graphene for Ultrahigh Volumetric Performance Supercapacitors," ACS Nano, vol. 8, No. 5, 2014 (Published online Apr. 14, 2014), pp. 4720-4729.

Zhang, X., et al., "Mechanically strong and highly conductive graphene aerogel and its use as electrodes for electrochemical power sources," Journal of Materials Chemistry, vol. 21, No. 18, May 14, 2011 (First Published Apr. 1, 2011), pp. 6494-6497.

Zhao, B., et al., "Supercapacitor performances of thermally reduced graphene oxide," Journal of Power Sources, vol. 198, Jan. 15, 2012 (Available online Oct. 1, 2011), pp. 423-427.

Zhao, C., et al., "A facile route to synthesize transition metal oxide/reduced graphene oxide composites and their lithium storage performance," RSC Advances, vol. 3, No. 37, Oct. 7, 2013 (First Published Jul. 8, 2013), pp. 16597-16603.

International Search Report in corresponding/related International Application No. PCT/IB2017/054680, dated Feb. 2, 2018.

Written Opinion of the International Searching Authority in corresponding/related International Application No. PCT/IB2017/054680, dated Feb. 2, 2018.

Wu, Z.-S., et al., "Anchoring Hydrous RuO2 on Graphene Sheets for High-Performance Electrochemical Capacitors," Advanced Functional Materials, Oct. 22, 2010, vol. 20, No. 20, pp. 3595-3602.

Xu, B., et al., "What is the Choice for Supercapacitors: Graphene for Graphene Oxide?," Energy & Environmental Science, Jan. 1, 2011, vol. 4, No. 8, pp. 2826-2830.

Yan, J., et al., "Electrochemical Properties fo Graphene Nanosheet/ Carbon Black Composites as Electrodes for Supercapacitors," Carbon, May 10, 2010, vol. 48, No. 6, pp. 1731-1737, Elsevier, Oxford, GB.

\* cited by examiner

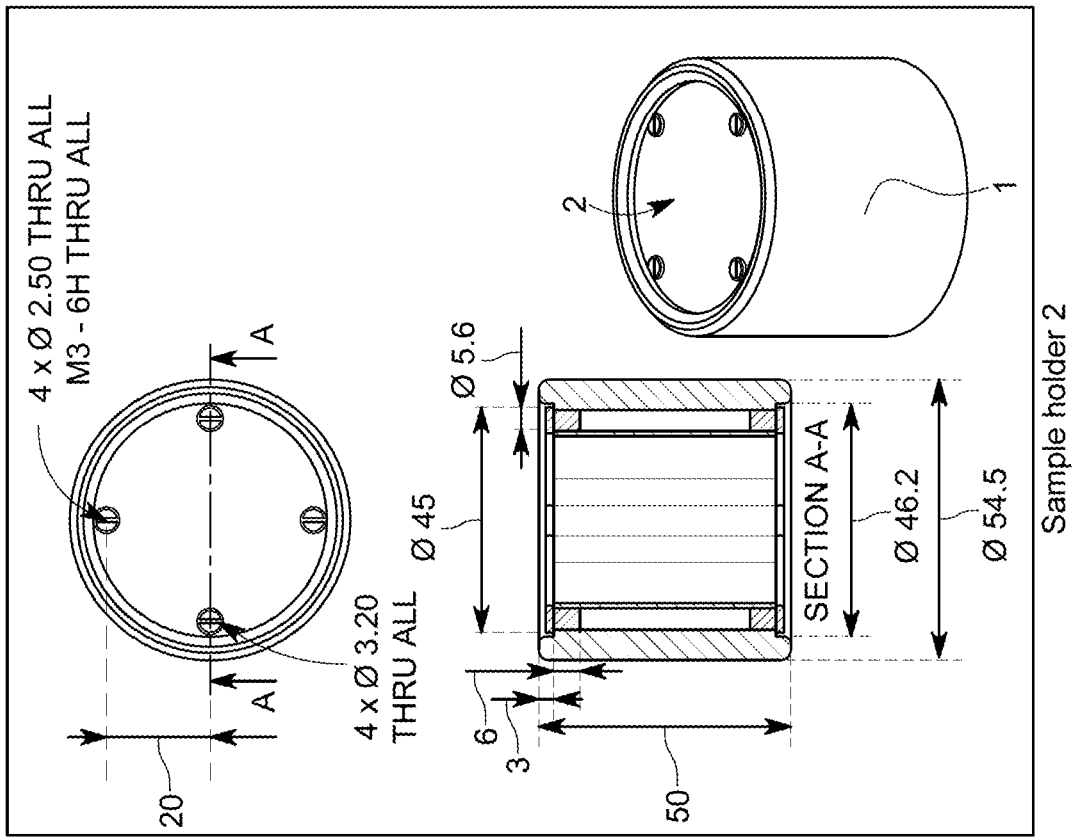
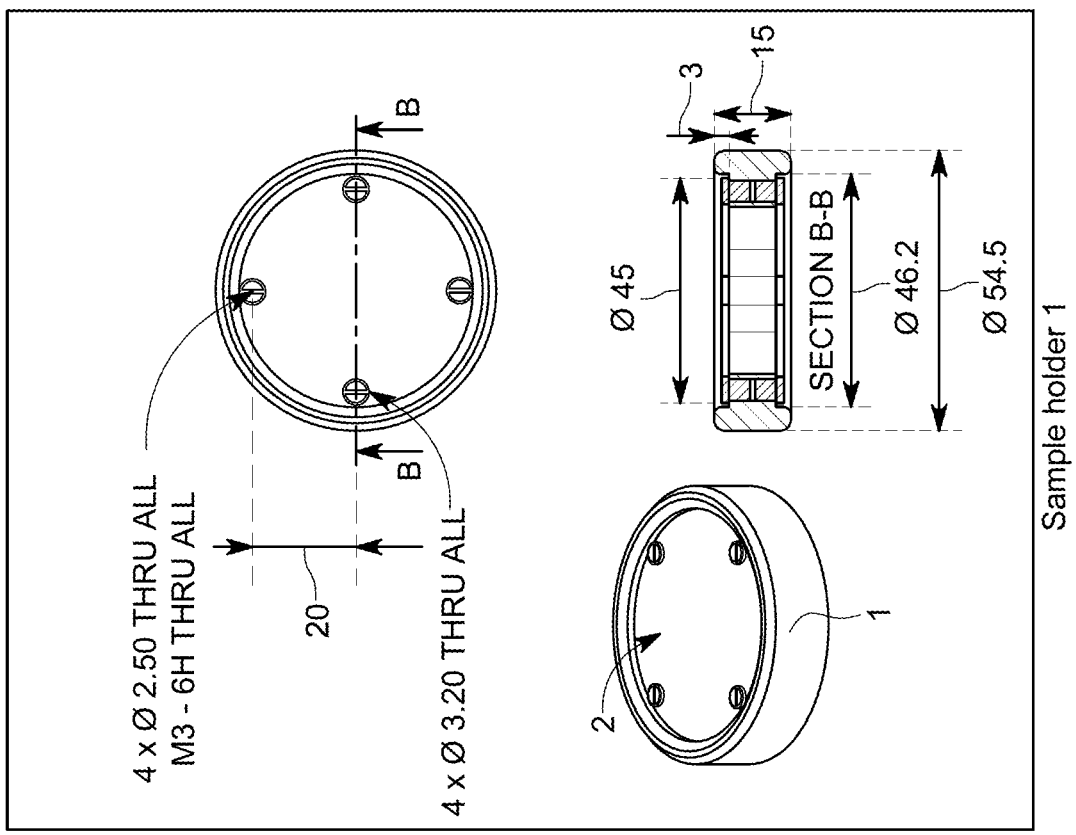
FIG. 12

Figure 16

Comparison of surface area of rGO prepared by the hydrothermal reduction method

| Reduction method | Starting material | Reduction conditions | Drying method | BET surface area (m²/g) | References |
|---|---|---|---|---|---|
| Hydrothermal | GO-freeze-dried | at 190oC for 12 hours in 0.1M $H_2SO_4$ under 180 psi | At 40 C | 102.29 | Journal of Solid State Electrochemistry, 2014. 19(2): p. 361-380 |
| Hydrothermal | GO-freeze-dried | At 190oC for 12 hours in water under 180 psi | At 40 C | - | Journal of Solid State Electrochemistry, 2014. 19(2): p. 361-380 |
| Hydrothermal | GO-freeze-dried | At 190oC for 12 hours in N2H4 under 180 psi | At 40 C | - | Journal of Solid State Electrochemistry, 2014. 19(2): p. 361-380 |
| Hydrothermal | GO-modified Hummers method | 100 mg GO +80 ml water at 180 C for 6h | Dry at 60 °C overnight | 62.4 | RSC Adv.,2014,4,42412–42417 |
| Hydrothermal | GO- modified Stau-denmaier's method | 2 mg/g GO at 180 C for 24 h | Dry in ambient conditions | 30.8 | E.C. Vermisoglou et al. / Applied Surface Science 358 (2015) 100–109 |
| Hydrothermal | GO- modified Stau-denmaier's method | 2 mg/g GO at 180 C for 22 h | Dry in ambient conditions | 25.0 | E.C. Vermisoglou et al. / Applied Surface Science 358 (2015) 100–109 |

This work:
rGO/CPD = 364 m²/g

Figure 17. GO - N₂ adsorption- desorption isotherm and pore-size distributions

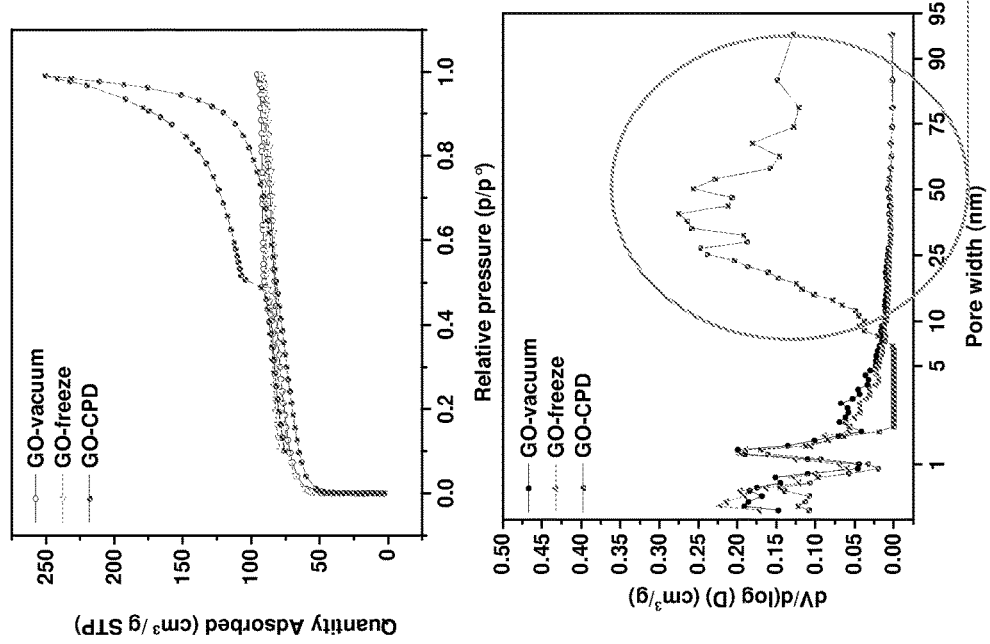

Table 3. Specific surface area and pore structure of the GO materials studied.

| material | BET surface area (m²/g) | Pore volume (cm³/g) | Micropore Area (m²/g) | t-Plot external surface area (m²/g) | t-Plot micropore volume (cm³/g) |
|---|---|---|---|---|---|
| GO-vacuum | 283 | 0.14 | 264 | 19 | 0.11 |
| GO-freeze | 290 | 0.14 | 271 | 19 | 0.11 |
| GO-CPD | 258 | 0.38 | 191 | 66 | 0.08 |

Figure 17. (a) Nitrogen adsorption-desorption isotherms; (b) pore-size distributions for N₂ (calculated by using a slit DFT slit model).

This signature is unique to the CPD dried material; mesopore range is activated

Figure 18. GO - CO$_2$ Storage Capacity
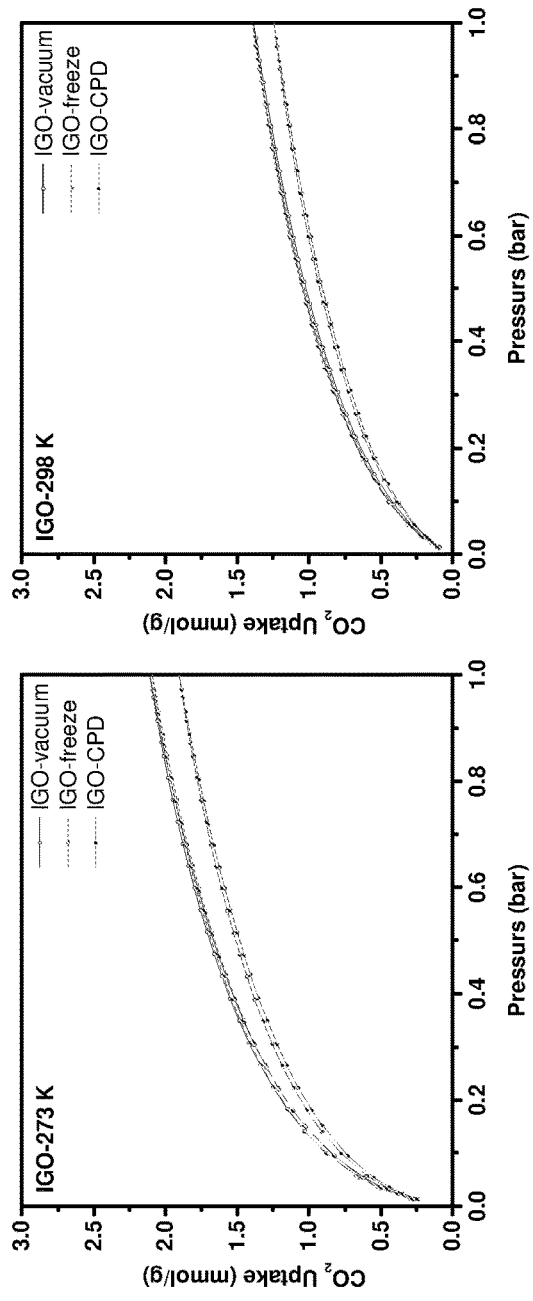
Figure 18. (a) CO$_2$ adsorption isotherms at 273 and 298 K for IGO.
CPD is not as effective possibly due to higher density of mesopores. Microporous materials (IGO/Vac and IGO/Freeze) are best suited for gas storage of small molecules

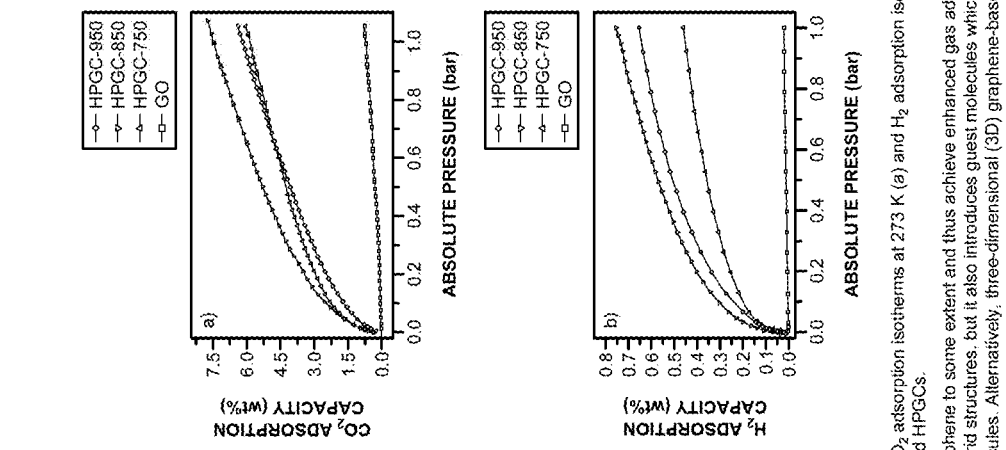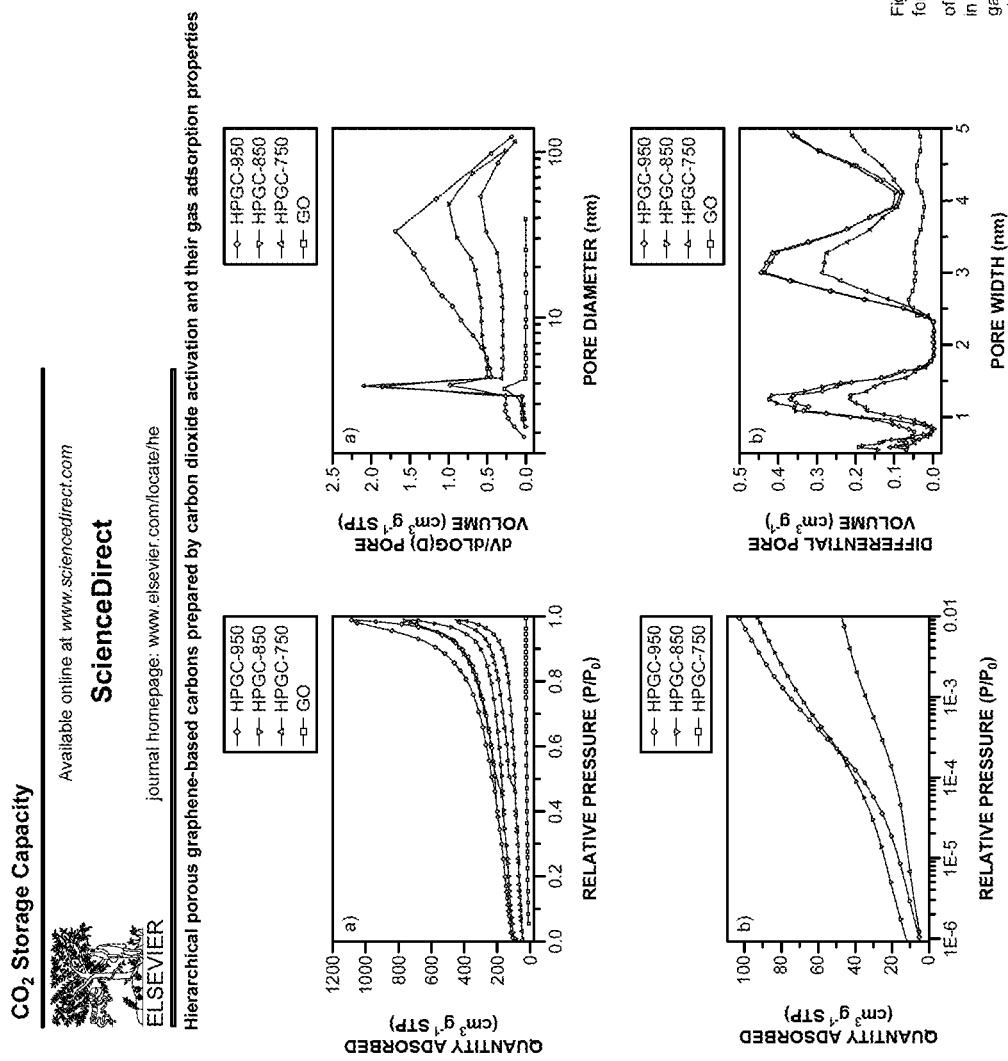
FIG. 19

GRAPHENE MATERIALS AND IMPROVED METHODS OF MAKING, DRYING, AND APPLICATIONS

CROSS-REFERENCE TO RELATED APPLICATIONS

This application is a U.S. National Stage Application of International Application No. PCT/IB2017/054680, filed on Aug. 1, 2017, which claims priority and benefit from U.S. Provisional Application No. 62/375,852, filed Aug. 16, 2016, and U.S. Provisional Application No. 62/377,640, filed Aug. 21, 2016, the entire contents of which are incorporated herein by reference.

INTRODUCTION

Graphene flakes can be produced in large scale by reducing graphene oxide (GO).[1] Methods to carry out this reaction are varied and include the use of chemicals such as hydrazine[2] or sodium borohydride.[3] Thermal and hydrothermal treatments are two other popular reduction routes[4,5]. The latter is also commonly used to decorate graphene flakes with a range of nanoparticles, sometimes in tandem with the reduction of the parent GO.[6-10] These composite materials have been proposed for applications in, for example, catalysis[11-13], energy storage/conversion[14,15,16], optics[17] and drug delivery.[18] Given that reduced graphene oxide (rGO) is a promising material for electrochemical double layer capacitor (EDLC) electrodes, it is important that its specific surface area be maximized. However, a literature search reveals that, to the best of the inventors' knowledge, most reported hydrothermally-reduced graphene oxide composites have a relatively low surface area, <100 $m^2\ g^{-1}$.[19-21] In this respect, a key step is the solvent-drying process after extracting the rGO product from the autoclave. The most common approach is air or vacuum drying under mild temperatures (<100° C.), a method that has been found to induce the agglomeration of rGO flakes.[22-24] Briefly, the porous structure of the "wet" rGO collapses upon drying as it is subjected to surface tension and capillary forces. One less-commonly used approach, which has been used in the preparation of aerogel materials, is freeze drying.[25] This process consists of removing water from frozen material by sublimation and desorption under vacuum. However, various stresses are generated during the freezing and drying steps, particularly due to the so called bound water (the small percentage of water that remains in the liquid state and does not freeze). Whether employing air, vacuum or freeze drying, residual humidity and induced stresses are two common factors in these methods that considerably defeat the purpose of obtaining high surface area, dry rGO powders (FIG. 1).

SUMMARY

One possible way to avert the agglomeration and various stresses of the materials is to use CPD, employed in the preparation of biological specimens (e.g. plant tissue) for electron microscopy imaging[26-28]. However, to the best of the inventors' knowledge, its application to drying of powdered carbon materials such as rGO is not explored yet. In the case of hydrothermally-reduced GO, the water would be exchanged by the intermediate dehydration liquid, such as ethanol, which would in turn be replaced by supercritical $CO_2$. In the absence of a liquid-air phase boundary, surface tension is eliminated and, upon, release of the $CO_2$ as gas, the dry, porous rGO could be collected (FIGS. 1 and 6).

Having surveyed the literature, the embodiments described and/or claimed herein appear to be the first time that CPD has been employed as a drying process for, for example, rGO. More importantly, there is no real appreciation of how the drying step may influence the properties of rGO materials such as their capacitance performance or other electrochemical properties. To address this issue, we compared the effect of employing vacuum, freeze and CPD drying methods on the morphology, specific surface area, porosity and electrochemistry of hydrothermally-reduced GO. In one embodiment, for sake of clarity, the method is not used with, for, or to produce an aerogel material.

Embodiments described and/or claimed herein include improved compositions, materials, devices, instrumentation, and systems, as well as methods of making and using such compositions, materials, devices, instrumentation, and systems. More particularly, an objective was to replace the vacuum drying method by an alternative approach capable of leading to weak residual humidity and weak stresses during drying, providing for improved compositions and materials. Devices such as supercapacitors can be prepared with use of the compositions and materials described herein.

Particular embodiments include, for example, a composition comprising graphene oxide or reduced graphene oxide which is mesoporous and has a specific surface area of at least 364 $m^2/g$ ("embodiment A"). Another embodiment is an electrode composition which comprises the composition A, wherein the electrode composition has a supercapacitance of at least 441 F/g. In another embodiment, the graphene oxide or reduced graphene oxide shows from a BET surface analysis the presence of micropores and mesopores. In one embodiment, the graphene oxide or reduced graphene oxide, when dried to a powder material with a critical point dryer, shows a predominance of mesopores over micropores and macropores, identifiable by gas adsorption analysis. In one embodiment, the predominance of mesopores results in the improvement of a specific capacitance and/or a gas adsorption capability for the graphene oxide or reduced graphene oxide.

Another embodiment provides for a composition (which can be called "embodiment one") prepared by a method comprising: critical point drying at least one graphene oxide material or reduced graphene oxide material with use of a critical point dryer to produce a dried graphene oxide material or a dried reduced graphene oxide material, wherein the critical point dryer is used with a sample holder comprising metal mesh, optionally the metal mesh having pores having a pore width of 500 microns or less, or 250 microns or less, or 150 microns or less, or 50 microns to 250 microns. The dried graphene oxide material can be subjected to hydrothermal reduction to form reduced graphene oxide.

In one embodiment, the graphene oxide or reduced graphene oxide has a specific surface area of at least 364 $m^2/g$.

In one embodiment, the graphene oxide or reduced graphene oxide shows from a BET surface analysis the presence of micropores and mesopores.

In one embodiment, an electrode composition comprises a composition of "embodiment A" or "embodiment one," or any other composition described herein, wherein the electrode composition has a supercapacitance of at least 441 F/g.

Another embodiment provides for a method comprising: critical point drying at least one graphene oxide material or reduced graphene oxide material with use of a critical point dryer to produce a dried graphene oxide material, wherein the critical point dryer is used with a sample holder comprising metal mesh, optionally the metal mesh having pores having a pore width of 500 microns or less, or 250 microns or less, or 150 microns or less, or 50 microns to 250 microns. The dried graphene oxide material can be subjected to hydrothermal reduction to form reduced graphene oxide.

In one embodiment, the metal mesh is stainless steel mesh. In another embodiment, the sample holder comprises walls of a fluorinated polymer, optionally polytetrafluoroethylene.

In another embodiment, the at least one graphene oxide material is an improved graphene oxide material.

In another embodiment, the hydrothermal reduction is carried out at a temperature of at least 150° C.

Another embodiment provides for a critical point dryer comprising a system for critical point drying and also supporting an interchangeable sample holder, wherein dryer comprises the interchangeable sample holder and the interchangeable sample holder comprises metal mesh, optionally with pores having a pore width of 500 microns or less.

In sum, the selection of the post-synthesis drying approach for hydrothermally reduced GO plays a significant role in controlling properties such as, for example, the surface area, porosity and electrochemical response of this material. By creatively fine tuning this step, record high specific surface area and capacitance can be achieved for the rGO/CPD product (364 cm$^2$ g$^{-1}$ and 441 Fg$^{-1}$, respectively). Therefore, it is likely that the preservation of the porous network in rGO materials for supercapacitor electrodes provides: (i) higher capacitance levels; (ii) faster electron transport during the charge/discharge processes; and/or (iii) better transport pathways for solvated ions. Customizing the size of the mesopores can further improve the capacitance performance of these materials.

BRIEF DESCRIPTION OF THE FIGURES

FIG. 12 shows drawings in different perspectives for two embodiments for a smaller volume (left) and a larger volume (right) sample cell for CPD use.

FIG. 16 shows additional specific surface areas reported in the literature for rGO using the hydrothermal reduction method (see also Table II).

FIG. 17 shows more data for GO—$N_2$ adsorption-desorption isotherm and pore-size distributions with particular focus on gas absorption application.

FIG. 18 shows GO—$CO_2$ storage capacity.

FIG. 19 shows $CO_2$ storage capacity from literature.

DETAILED DESCRIPTION

Introduction

Figure 1:
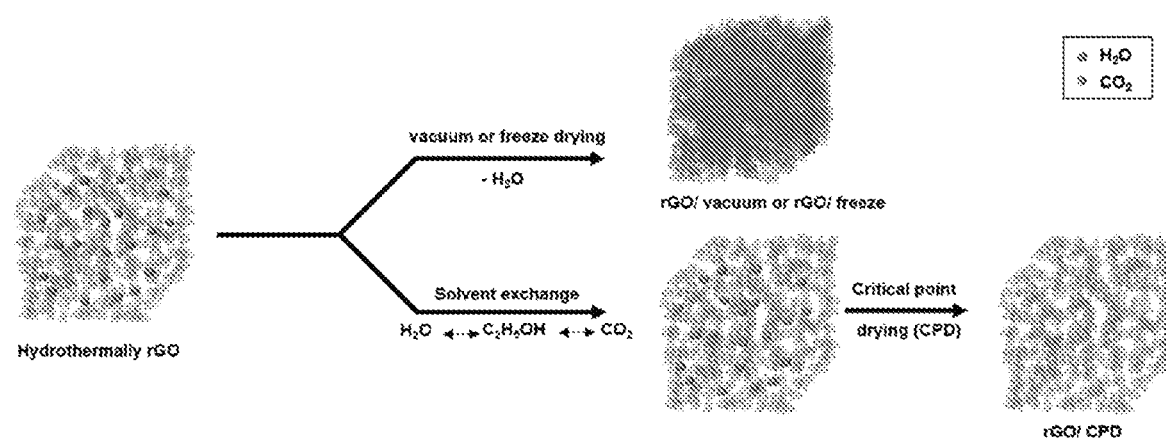
FIG. 1 provides a schematic illustration of the various drying processes available for rGO. CPD is known to preserve porous three-dimensional networks upon water extraction as opposed to approaches based in vacuum or freeze drying that result in pore collapse.

U.S. provisional filing Ser. No. 62/375,852 filed Aug. 16, 2016 is hereby incorporated by reference in its entirety.

All references cited herein are incorporated herein by reference in their entirety.

Open transitional terms such as "comprising" or "comprises" can be substituted if desired for particular embodiments with partially closed or closed terms such as "consisting essentially of," "consists essentially of," "consists of," or "consisting of."

One aspect provides a method comprising: critical point drying at least one graphene oxide material or reduced graphene oxide material with use of a critical point dryer to produce a dried graphene oxide material or reduced graphene oxide material, wherein the critical point dryer is used with a sample holder comprising metal mesh, optionally with pores having a pore width of 500 microns or less, or 250 microns or less, or 150 microns or less, or 50 microns to 250 microns. Another aspect is a composition or material prepared by the methods described herein. In one embodiment, the composition or material has a specific surface area of at least 364 m²/g. In another embodiment, a supercapacitor can be prepared having a supercapacitance of at least 441 F/g. More detailed description for these and other aspects are provided.

Critical Point Drying Method

Critical point drying (CPD) is generally known in the art, and instrumentation for carrying out CPD (critical point dryers, accessories, and materials) are available commercially. The sample holder and larger instrumentation for critical point drying are described further hereinbelow. Examples of CPD in the patent literature include US Patent Publications 2015/0216162; 2015/0079669; 2013/0239996; and 2013/0056036.

Any of the powders described herein, including graphene oxide and reduced graphene oxide, can be subjected to CPD as described herein.

Graphene Oxide Materials

Graphene oxide (GO) materials are known in the art, as illustrated by the references cited herein, for example. The material can be in powder form. The material can be in different forms derived from the drying step as per the methods described herein. The GO material can be subjected to CPD. The GO material subjected to CPD can also undergo hydrothermal reduction and then subjected once again to CPD. The GO subjected to CPD can undergo further processing steps. The hydrothermally reduced GO subjected to CPD can also undergo further processing steps. The CPD-dried GO and reduced GO (or related processed materials) can be subjected to characterization at any one of these points in the method when it is in any of these forms. In one embodiment, the so-called "improved graphene oxide" can be used.

Hydrothermal Reduction Step

After the critical point drying step for graphene oxide, the dried graphene oxide material can be further subjected to hydrothermal reduction which is a process known in the art. Additional critical point drying can be carried out on the reduced graphene oxide material.

Characterization of Product

The graphene product can be characterized by methods known in the art. Characterization methods include characterization methods known for carbon materials, including graphene materials, such as, for example, SEM, TEM, surface area, BET specific surface area, XPS, X-ray powder diffraction, FT-IR, Raman spectroscopy, AFM, TGA, DSC, electronic conductivity measurements, cyclic voltammetry, chronopotentiometry, and other methods known in the art.

In one embodiment, the graphene oxide or reduced graphene oxide shows an open lamellar morphology with sets of nanosheet stacks visible in SEM micrographs. The SEM method is further described in the working examples and figures herein.

BET surface area analysis is known in the art. The method is further described in the working examples and figures herein. In one embodiment, a BET surface area of the graphene oxide or reduced graphene oxide is at least 150 m² g⁻¹, or at least 200 m² g⁻¹, or at least 250 m² g⁻¹, or at least 300 m² g⁻¹, or at least 350 m² g⁻¹, or at least 364 M² g⁻¹, or at least 400 m² g⁻¹.

The graphene oxide or reduced graphene oxide can also provide for high supercapacitance values such as, for example, at least 300 F/g, or at least 400 F/g, or at least 441 F/g.

Critical Point Dryer Instruments and Systems

Critical point dryers are commercially available and come with accessories, instruction manuals, hardware, and software. The dryers can be semi-automated or automated.

The dryers can be adapted to have interchangeable sample holders. The sample holder can be modified depending on the sample to be analyzed. The sample holder can be adapted for the drying of powders.

FIGS. 12-15 show embodiments for a sample holder which can be used for the critical point drying.

FIG. 12 shows a smaller volume sample holder (left, Sample Holder 1) and a larger volume sample holder (right, Sample Holder 2), showing for each top, side (cross-sectional), and perspective views. Sample Holder 1 has a height of 15 mm, whereas Sample Holder 2 has a height of 50 mm. One can adapt the size of the sample holder to the volume of the sample. Typical volumes can be, for example, 5 mL to 100 mL, or 10 mL to 50 mL. In this embodiment, element 1 is a cylindrically-shaped polytetrafluoroethylene vessel, and element 2 is a stainless steel screen or mesh having an 125 micron micropore size. More generally, the screen mesh can be, for example, 10 microns to 150 microns, or 50 microns to 150 microns, or 100 microns to 150 microns. Even more generally, the sample holder comprising metal mesh can have pores adapted for powder drying, including small particle size powder drying, having a pore width of, for example, 500 microns or less, or 250 microns or less, or 150 microns or less, or 50 microns to 250 microns, or 50 microns to 150 microns, or 100 microns to 150 microns. The screen can be used on the top and bottom of the holder. Other materials and sizes can be used. In some embodiments, no special tools are needed to handle the sample holder. Fasteners such as slotted pan head screws can be used to hold the metal mesh to the cell.

FIG. 13 shows again smaller and larger size embodiments for two sample holders but without the metal mesh or fasteners. Again, top, side (cross-sectional), and perspective views are provided. The only difference between the two sample holders is in their height (again, 15 versus 50 mm).

Figure 14:
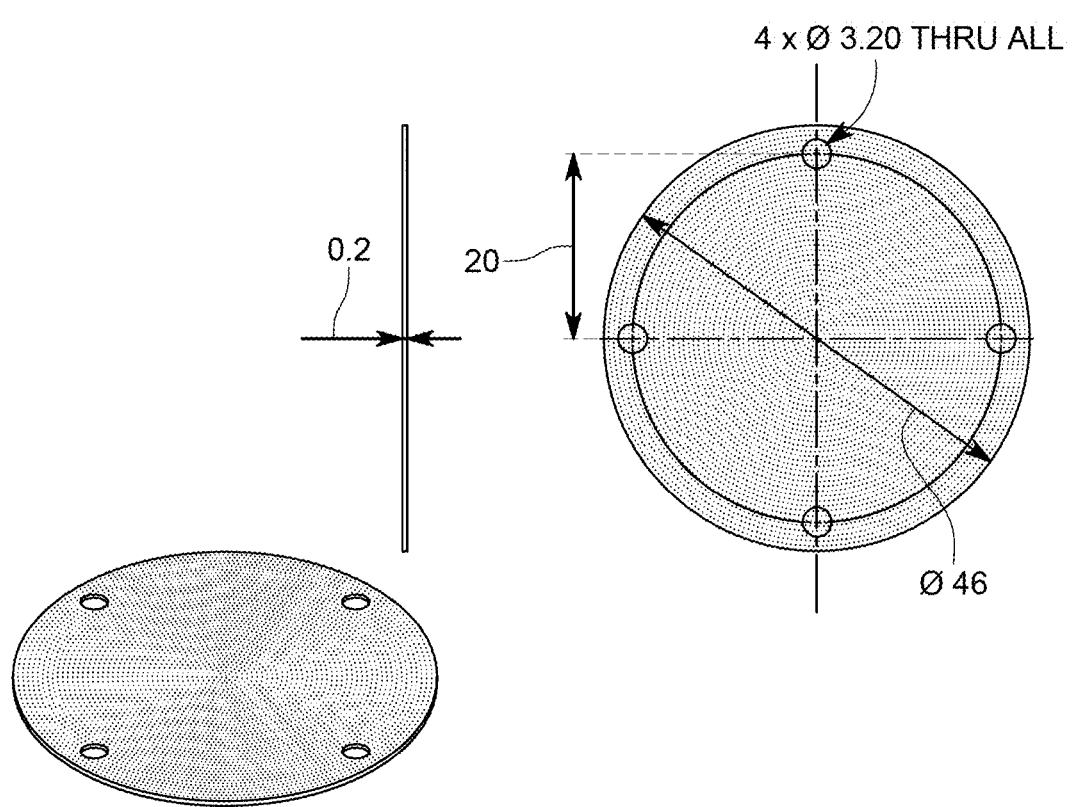
FIG. 14 shows the metal mesh in top view and perspective view.

FIG. 14 shows an embodiment for the metal mesh in top view and perspective view. The metal mesh can be in a generally circular form. Openings can be provided to function with the fasteners. The thickness of the metal mesh can be, for example, 1 mm to 2 mm. The metal mesh can be made from, for example, metal such as, for example, steel including, for example, stainless steel.

Figure 15A:
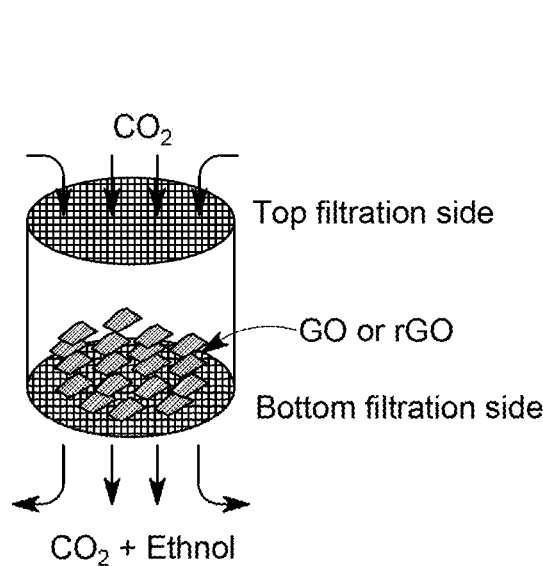
FIG. 15 shows an embodiment for (a) schematic diagram of a $CO_2$ critical point drying vessel and images of (b) the $CO_2$ critical point dryer and (c) the microfiltration Teflon vessel.
Figure 15B:
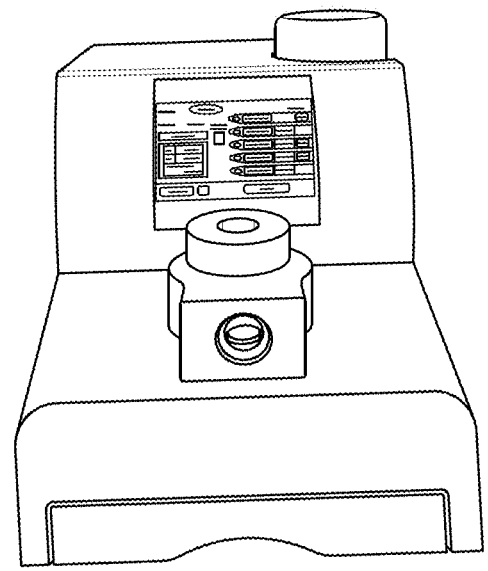
Figure 15C:
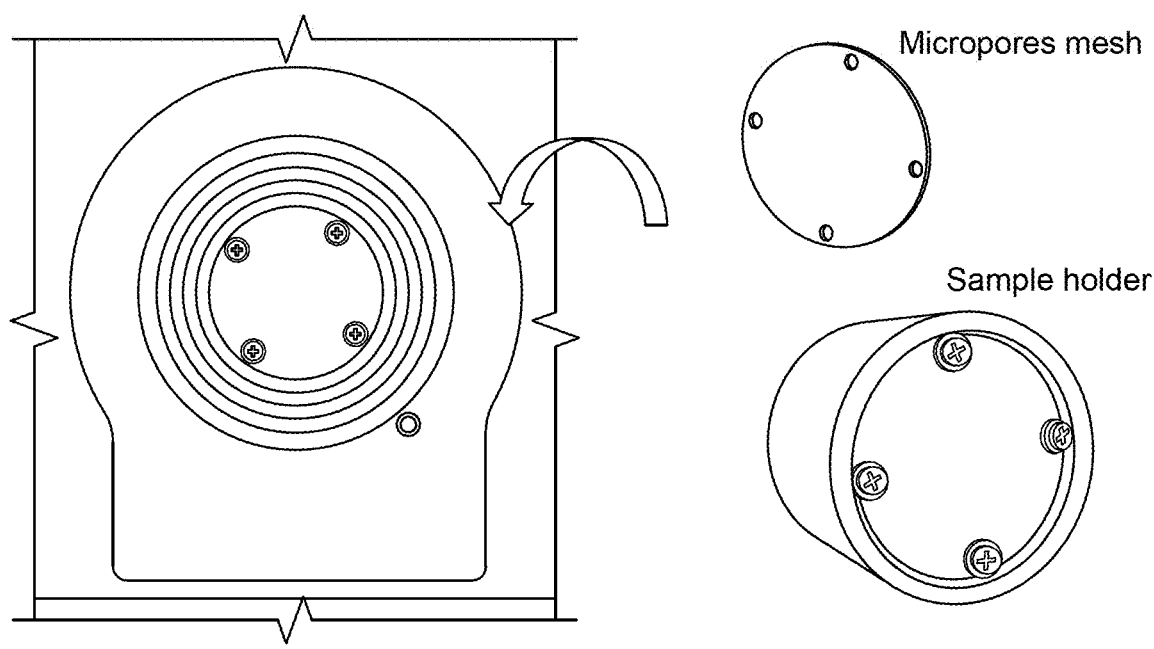

FIG. 15 shows in an embodiment (a) schematic diagram of a $CO_2$ critical point drying vessel and images of (b) the $CO_2$ critical point dryer and (c) the microfiltration polytetrafluoroethylene vessel.

For handling and processing of powder materials, a sample holder with filtration micropores can be designed and installed in a critical point drying chamber (e.g., Leica EM CPD 300), as shown in FIG. 15. With this sample holder, the intermediate solvent (e.g. ethanol) can be exchange with liquid $CO_2$ without losing the powder materials. Therefore, the powder materials can be collected after the drying process.

Companies offering CPD instrumentation include, for example, Leica Microsystems (Buffalo Grove, Ill.), tousimis (Rockville, Md.), Electron Microscopy Sciences (EMS, Hatfield, Pa.), and SPI Supplies/Structure Probe (West Chester, Pa.).

WORKING EXAMPLES: EXPERIMENTAL

Additional embodiments are provided in the non-limiting working examples provided herein.

The preparation of the rGO materials was carried out using two steps. Firstly, the oxidation of graphite powder followed the procedure outlined in our previous work (adapted from the so-called improved Hummers' method)[29, 30].

The conventional oxidation method of graphene oxide (GO) is the Hummers' method ($KMnO_4$, $NaNO_3$, $H_2SO_4$), which is the most common approach used to produce GO. In this work, the so-called improved-Hummers' method ($KMnO_4$, 9:1 $H_2SO_4/H_3PO_4$) was used. In this regard, Tour et al. have demonstrated that preparing GO in 9:1 $H_2SO_4/H_3PO_4$ while excluding $NaNO_3$ clearly improves the efficiency of the oxidation process and subsequently the quality of the produced GO[29]. Overall, the amounts used and conditions employed were also in order with those commonly described in the literature (see, for example, cited references 1, 29, and 42-44 hereinbelow). In our previous work, we demonstrated that the reduced graphene oxide materials are highly dependent on the oxidation-reduction strategy selected which could influence (if not dominate) their performance for some of the applications proposed in the literature (e.g. supercapacitors)[30].

Next, the GO product was divided into three equal parts: the first was dried in vacuum at 60° C. for 12 h, the second was freeze-dried under reduced pressure (0.133 mbar) for 24 hours and the third part was dried by CPD (in $CO_2$). Then, the reduction of the dried GO parts was undertaken through a hydrothermal method (at 180° C. for 24 h). This was followed by a drying step similar to, and consistent with, the one used for the parent GO part. The dried hydrothermal rGO products are hereafter designated as rGO/vacuum, rGO/freeze and rGO/CPD.

Further details on structural, chemical and electrochemical characterization can be found in the supplementary information described below.

Results and Discussion

Figure 2:
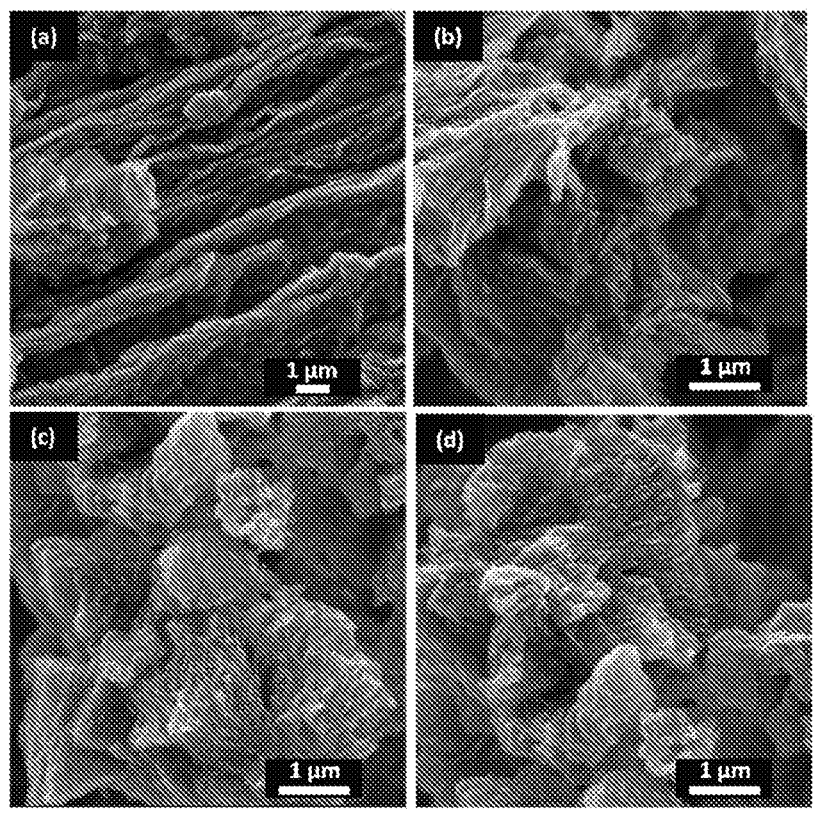
FIG. 2 provides SEM images of: (a) rGO/vacuum; (b) rGO/freeze; (c-d) rGO/CPD.
Figure 5:
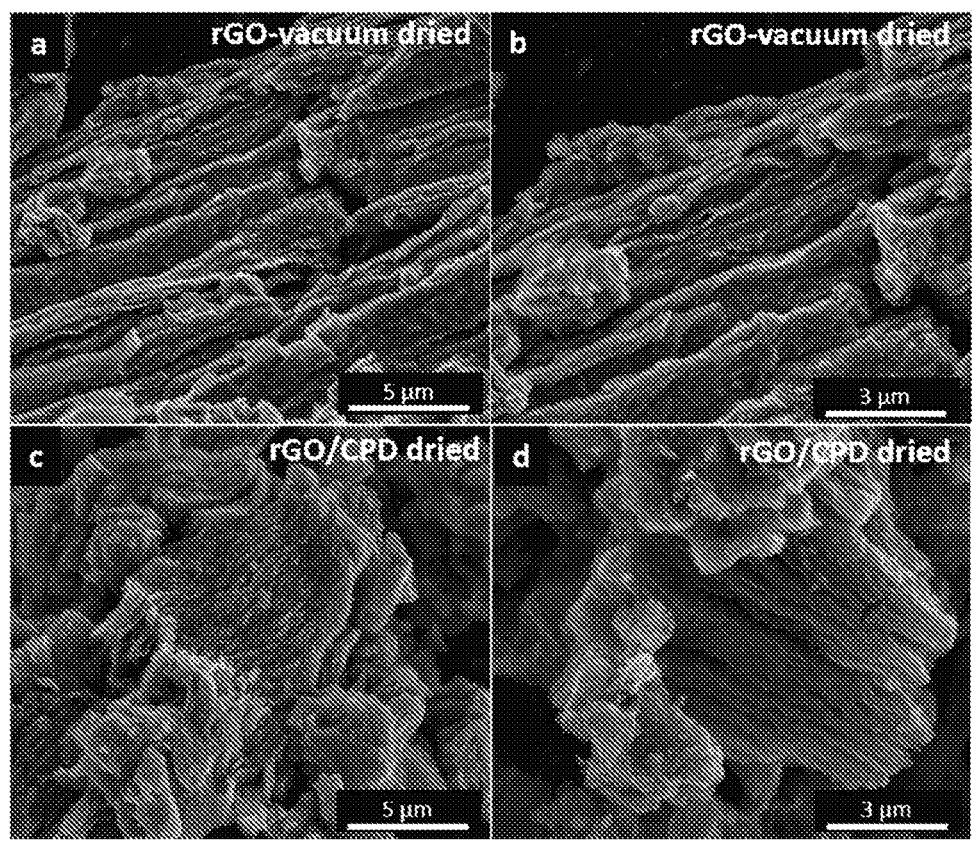
FIG. 5 provides SEM images of the (a-b) rGO/vacuum and (c-d) rGO/CPD samples. It is easily recognizable that the separation of the layers in the CPD product is more regular/homogenous across the entire sample, i.e. not restricted to a particular aggregate or parts of this.
Figure 6:
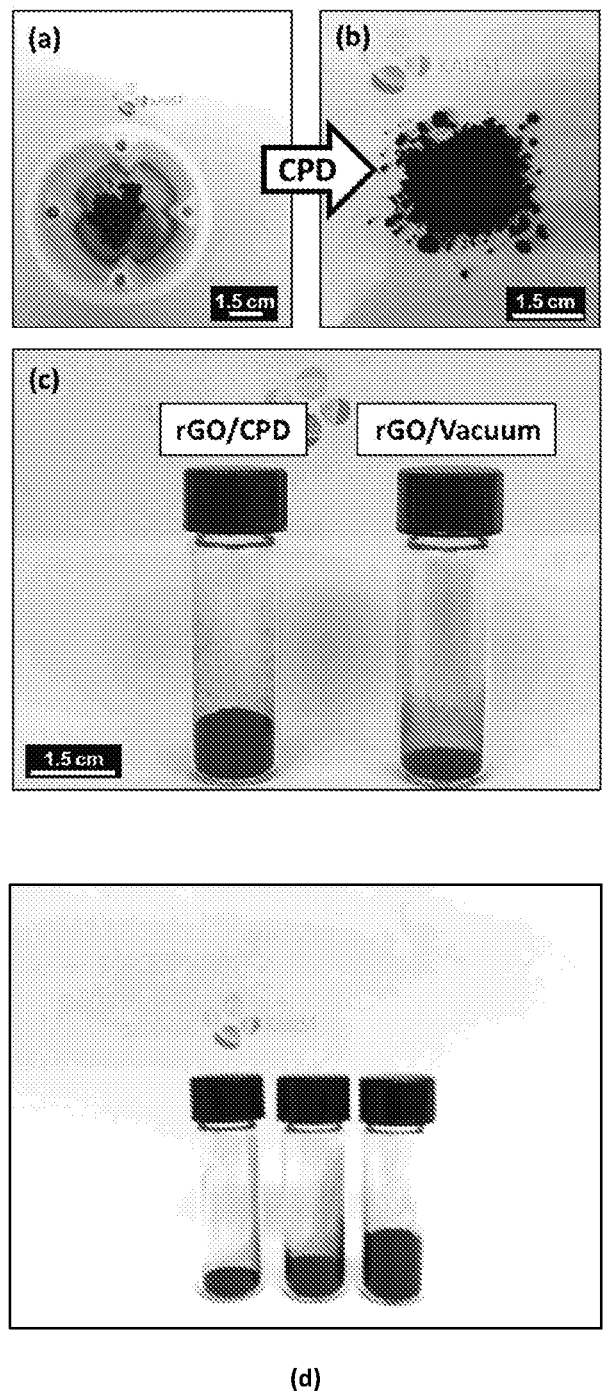
FIG. 6 provides digital photos of: (a) the wet rGO, (b) the rGO in (a) after CPD processing, (c) two vials with 100 mg each of dried rGO products, (d) two vials from FIG. 6c, but also third vial shown with freeze-dried rGO—the higher volume occupied by the rGO/CPD compared to vacuumed dried rGO and freeze-dried rGO is notable. Example is shown for rGO but applies equally to GO.

Concerning the morphology and size of the rGO aggregates, scanning electron microscopy (SEM) and optical imaging suggest there is a visible effect when using varied drying methods (FIGS. 2, 5, and 6). Of the three hydrothermal rGO samples studied (rGO/vacuum, rGO/freeze and rGO/CPD), the one dried with CPD clearly exhibited the finest and most consistent separation of the graphitic basal planes (FIGS. 2c and 2d, cf. also FIGS. 5c and 5d). Moreover, visual comparison of the products shows that, for identical mass, the rGO/CPD occupies a larger volume (FIG. 6). This attests the network collapse upon vacuum and freeze drying.

Figure 7:
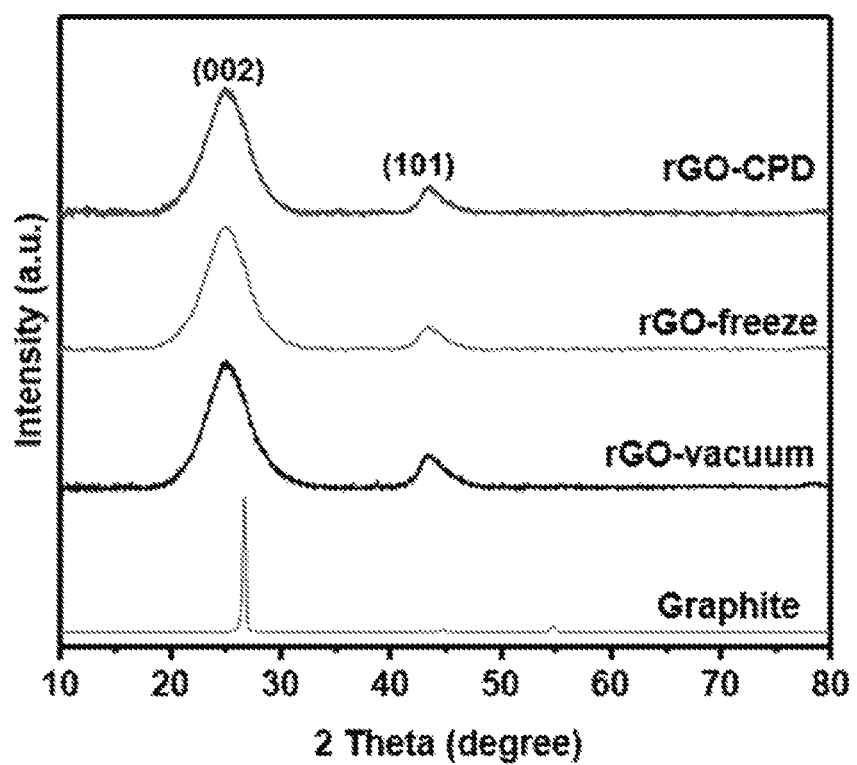
FIG. 7 provides powder XRD patterns of the graphite precursor, rGO/vacuum, rGO/freeze and rGO/CPD samples. The rGOs have equal spectra precluding therefore structural dissimilarities.
Figure 8:
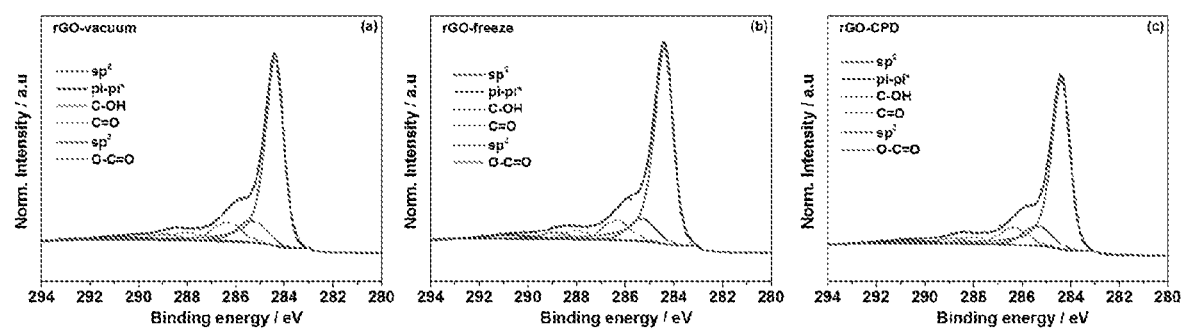
FIG. 8 shows high resolution XPS C1s spectra of (a) rGO/CPD, (b) rGO/freeze and (c) rGO/vacuum samples. The deconvolution of the C1s peak confirms the equivalent chemical identity in the three samples. The high-resolution C 1s spectrum was convoluted for rGO/vacuum, rGO/freeze and rGO/CPD. The spectrum shows an intense peak of C=C (sp$^2$ arrangement) located at 284.4 eV. Besides the C=C peak, the C 1s spectrum deconvolution identified five other bands: sp$^3$ (285.3 eV), C—OH (286.4 eV), C=O (288.0 eV), O—C=O (288.9) and the π-π*satellite peak (290.8 eV). The relative concentration (atomic %) of the components was calculated using the CasaXPS software: C=C 65%, sp$^3$ 13%, C—OH 11%, C=O 5%, O—C=O 3% and Pi-Pi*3%.

X-ray powder diffraction (XRD) and photoelectron spectroscopy (XPS) analyses were performed to compare the structure and surface chemistry of the rGOs as well as to assess the effectiveness of the reduction step. All samples exhibited two broad diffraction peaks at 2θ=25° and 43°, which were assigned to the (002) and (101) planes of graphite, respectively (FIG. 7).[31] The structural and chemical similarity of the rGOs was further confirmed by the high resolution XPS study of the C1 s peak, as shown in FIG. 8. Hence, independently of the drying method employed, the final products had equivalent reduction levels, structure and surface chemistry.

Figure 3:
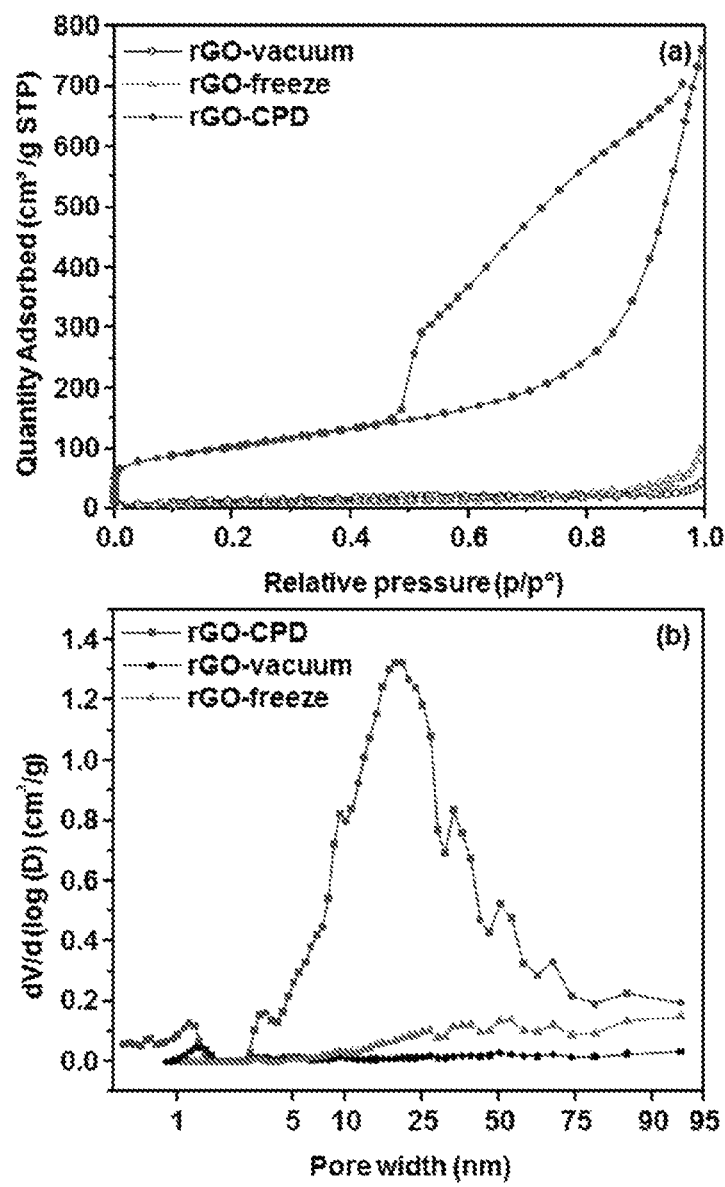
FIG. 3 shows (a) Nitrogen adsorption-desorption isotherms; (b) pore-size distributions for $N_2$ (calculated by using a slit DFT slit model). For FIG. 3(b), this signature is unique to CPD dried rGO; this defines the mesoporous range (2-50 nm) of pore size.
Figure 9:
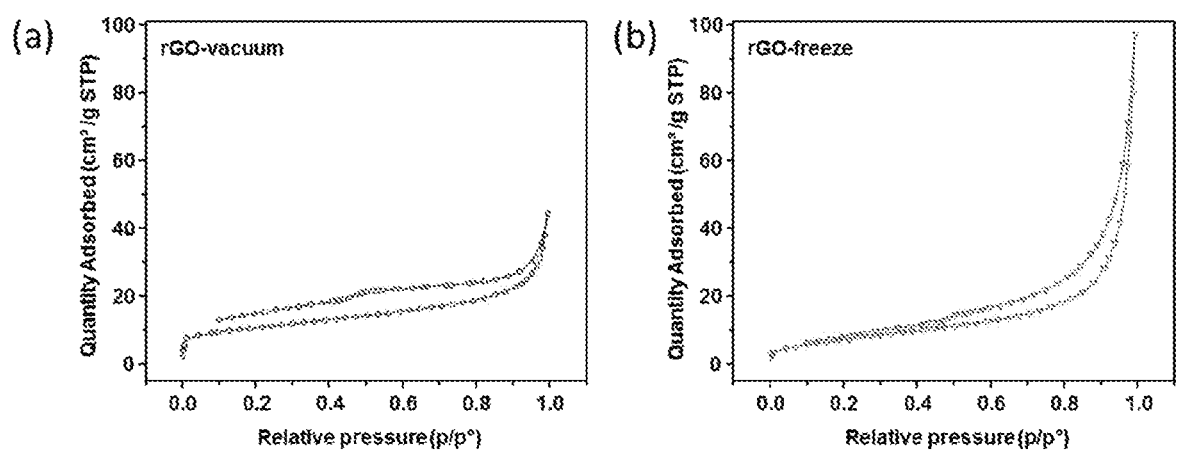
FIG. 9 shows nitrogen adsorption-desorption isotherms of: (a) rGO-vacuum, (b) rGO-freeze.

$N_2$ adsorption/desorption measurements were performed at 77 K to characterize the specific surface area and pore size distribution of the rGO materials (FIG. 3). The three isotherms in FIG. 3a are of type IV indicating the presence of mesopores, as per the IUPAC classification.[32] While similar in type, the isotherms show significant differences in $N_2$ uptake and shape of the hysteresis loop. Accordingly, the rGO/vacuum and rGO/freeze exhibited type H3 loops (FIG. 9), which are identified with plate-like porous aggregates as these originate slit-shaped interlayer pores.[33] In contrast, the rGO/CPD has a type H2 hysteresis response. This reveals the presence of a congruent network of interconnected pores. In addition, this sample showed large $N_2$ uptake which could be correlated with a total pore volume of 1.17 $cm^3$ $g^{-1}$ and a Brunauer-Emmet-Teller (BET) specific surface area of 364 $m^2$ $g^{-1}$. This area is one order of magnitude higher than those of the rGO/vacuum and rGO/freeze samples (Table 1). As previously stated, reported values for hydrothermal rGO, and respective composites, are usually <100 $m^2/g$. (see also Table II and FIG. 16)[19, 21, 20, 21, 34].

TABLE 1

Specific surface area and pore structure of the rGO materials studied.

| material | BET surface area ($m^2/g$) | Pore volume ($cm^3/g$) | Micropore Area ($m^2/g$) | t-Plot external surface area ($m^2/g$) | t-Plot micropore volume ($cm^3/g$) |
|---|---|---|---|---|---|
| rGO/vacuum | 39 | 0.06 | 11 | 27 | 0.005 |
| rGO/freeze | 28 | 0.15 | 1 | 27 | <0.001 |
| rGO/CPD | 364 | 1.17 | 45 | 318 | 0.023 |

Figure 10:
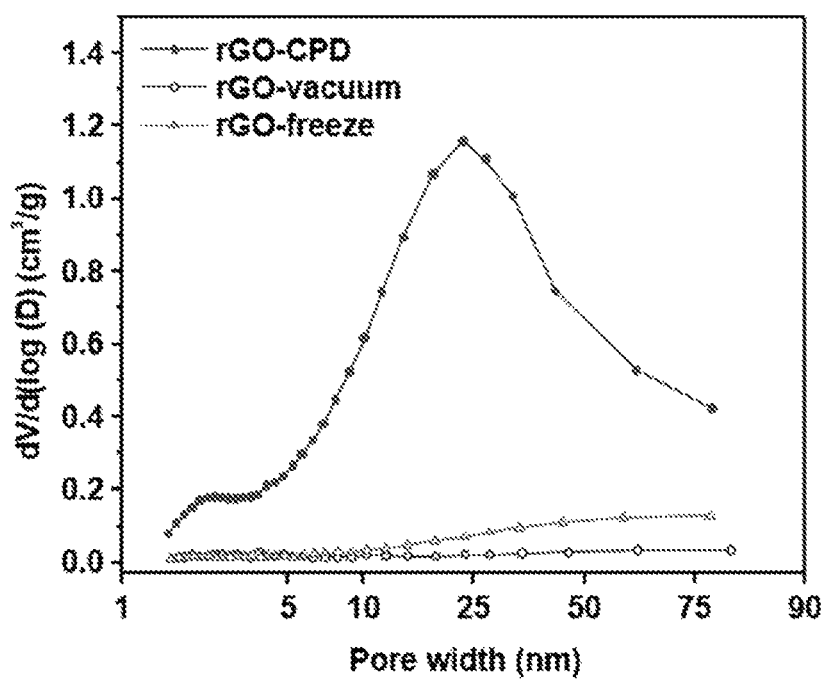
FIG. 10 shows pore-size distribution profiles from adsorption of $N_2$ on the studied rGO materials (calculated using the BJH method). See also FIG. 3.

Pore size distribution has been assessed by means of the Barrett-Joyner-Halenda (BJH) adsorption method and density functional theory (DFT) assuming slit pore shapes (FIGS. 10 and 3b, respectively). Although the textural analysis shows pores <2 nm in size for both rGO/vacuum and rGO/CPD, these account little in the overall porosity, as per the micropore volume and area values extracted from t-plots (see Table 1). Interestingly, the presence of micropores is absent in the rGO/freeze sample. From the BJH and DFT pore size distribution profiles, it is obvious why the rGO/CPD shows superior surface area. With a width range of about 1 nm to more than 75 nm, the largest contribution (mode) originates from 20 nm sized mesopores. Note that, at the critical point of $CO_2$ (304.1 K, 7.39 MPa), the exchange of molecules between the gas and fluid phases is balanced and the density of the fluid and gas phases is equal. The absence of a liquid-gas interface (surface tension is zero) is crucial to retain the original rGO nanosheets' network (no structural collapse, as schematised in FIG. 1). Furthermore, it is plausible that additional layer/nanosheet separation can be promoted by the expansion/release of intercalated $CO_2$.[35] Overall, the rGO/CPD is a mesoporous material with a relatively high surface area and wide pore size distribution. The contrast with the vacuum and freeze dried products (structurally collapsed) is easily observable by naked eye, as the side-by-side photo in FIG. 5 shows.

Figure 4:
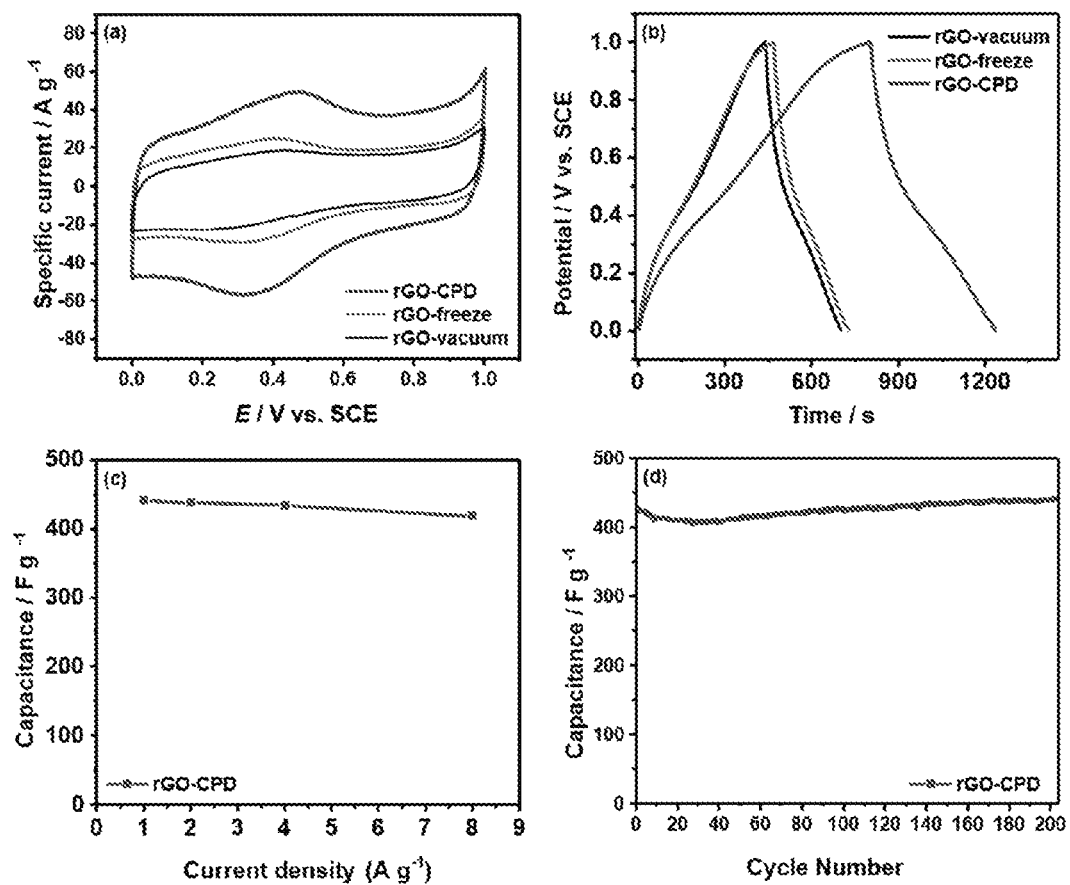
FIG. 4 shows (a) CV curves of rGO/vacuum, rGO/freeze, and rGO/CPD in 1M $H_2SO_4$ at a scan rate of 100 mV s$^{-1}$; (b) Galvanostatic charge-discharge curves at a constant current density of 1 A g$^{-1}$; (c) Specific capacitance of rGO/CPD at different current densities; (d) Cyclic performance of rGO/CPD at a current density of 1 A g$^{-1}$.
Figure 11:
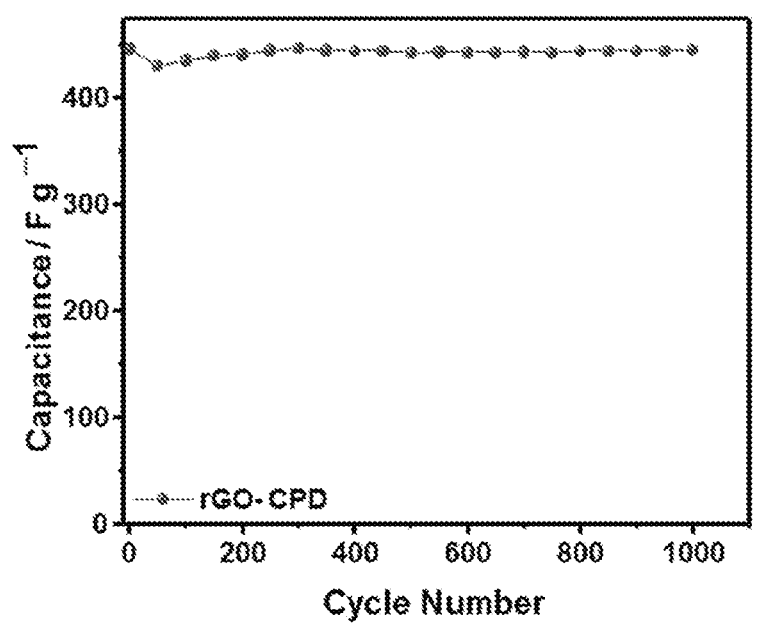
FIG. 11 shows cyclic performance of a rGO/CPD sample, at a current density of 1 A g$^{-1}$ in $H_2SO_4$. The capacitance is well retained throughout, at more than 400 F g$^{-1}$.
Figure 13:
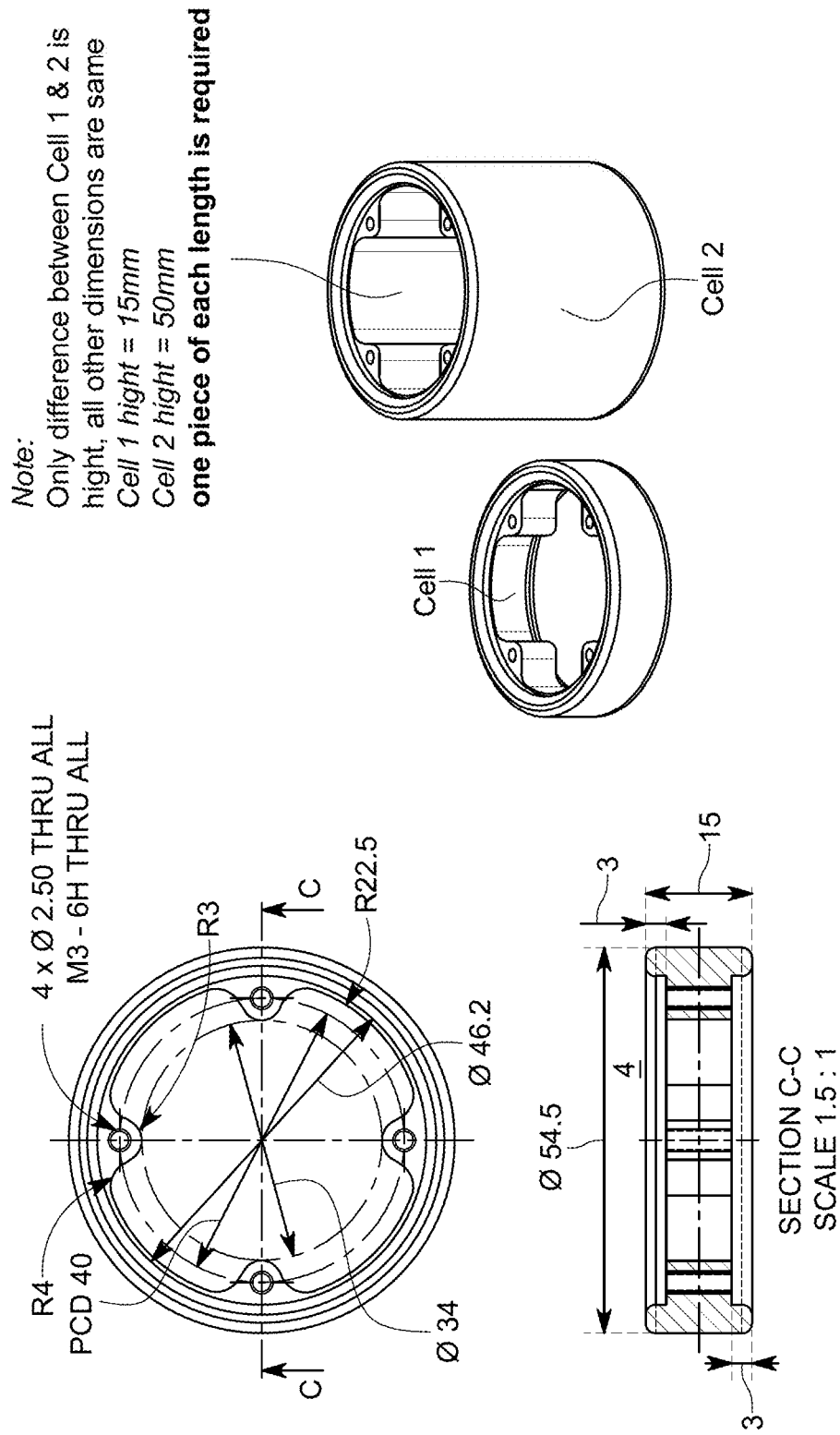
FIG. 13 also shows drawings in different perspectives for two embodiments for a smaller volume (left) and a larger volume (right) sample cell but without the metal mesh or fasteners.

To correlate the effect of the drying step with the properties of the rGO materials, their electrochemical capacitive behavior was characterized by cyclic voltammetry (CV) and galvanostatic charge-discharge (GCD) in a three-electrodes configuration (FIG. 4). While a fairly rectangular shape was obtained for all cases (indicating a dominant EDLC-type behavior), both the electrodes using rGO/vacuum and rGO/freeze materials exhibited low current responses when compared to the CV profile of the rGO/CPD electrode (FIG. 4a). The pair of broad peaks at ~0.3-0.4 V is attributed to the reversible redox reaction of residual oxygen-containing functional groups (e.g. hydroxyl, carbonyl and carboxyl), known to persist in the rGO materials[30, 36]. As for the GCD profiles in FIG. 4b, these repeatedly showed a slight non-linear shape, which confirmed the existence of both EDLC and pseudocapacitive responses in the materials. The calculated specific capacitance of the rGO/vacuum, rGO/freeze and rGO/CPD was 258, 262 and 441 F g$^{-1}$, respectively. The rate capability of the rGO/CPD electrode was tested by calculating the specific capacitances at current densities from 1 to 8 A g$^{-1}$ (FIG. 4c). The values extracted from the discharging curves were 441-419 F g$^{-1}$, indicating a remarkable consistency in the electrochemical response. Finally, the stability of the rGO/CPD electrode was studied using GCD at a current density of 1 A g$^{-1}$ for 200 cycles (FIG. 4d). One other rGO/CPD sample, also probed in a three-electrodes configuration, was cycled for a longer period of time (1000 cycles at 1 A g$^{-1}$) and showed similar behavior (FIG. 11). While the initial drop was most likely due to an activation process,[37] the results point to a long-term performance with full capacitance retention. Given the structural and chemical similarity of the materials, the excellent capacitance behavior and stability of rGO/CPD (almost two times higher than rGO/vacuum and rGO/freeze) can be attributed to the network of interconnected pores described above. The optimized network, where mesopores predominate, facilitates the rapid ion transportation and reversible adsorption of H$^+$ and SO$_4^{2-}$ during charge/discharge processes. Note that the specific capacitance achieved for the rGO/CPD material is considerably greater than other values reported in the literature for analogous rGO materials, usually <300 F g$^{-1}$ (cf. Table III)[1, 14, 38-41].

Supporting Information

1. Experimental Section 1.1. Drying Equipment

The vacuum drying process was performed in a Thermo Scientific Lindberg Blue M vacuum oven. For the freeze drying process, a Labconco Freezone 2.5plus was used. Finally, the critical point drying was performed in a Leica EM CPD300. Sample holders can be used as shown in FIGS. 12-15.

1.2. Characterisation

The powder X-ray diffraction (XRD) analysis was performed on a diffractometer (Bruker D8 Advance) with Cu K$_\alpha$ radiation ($\lambda$=1.5418 Å). The morphology of the samples was observed with scanning electron microscopy (SEM) (FEI Quanta 600, 4 kV). N$_2$ adsorption-desorption measurements were conducted at 77 K with a Micromeritics ASAP 2420 instrument. Prior to the analysis, the samples were degassed under vacuum at 80° C. for at least 12 h. The specific surface area was calculated using the Brunauer-Emmett-Teller (BET) method. The pore size distribution analysis in the mesopore range was performed using the Barrett-Joyner-Halenda. (BJH) formulism applied to the isotherm adsorption branch, and the full micro-meso pore size distribution was calculated using the DFT model assuming slit pores using the Microactive Interactive data analysis software. X-ray photoelectron spectroscopy (XPS) studies were carried out in a Kratos Axis Ultra DLD spectrometer equipped with a monochromatic Al K$\alpha$ X-ray source (hv=1486.6 eV) operating at 150 W, a multi-channel plate and delay line detector under a vacuum of ~10$^{-9}$ mbar. The survey and high-resolution XPS spectra were collected at fixed analyzer pass energies of 160 eV and 20 eV, respectively. Samples were mounted in floating mode in order to avoid differential charging. Binding energies were referenced to the sp$^2$ hybridized (C=C) carbon for the C 1s peak set at 284.4 eV.

1.3. Electrochemical Characterisation

For the electrochemical characterization, the working electrodes were prepared by mixing ~2 mg of the selected rGO with 15 µl of Nafion (Sigma-Aldrich, 5 wt. %), 500 µl of deionized water (MilliQ, 18.2 MΩ·cm) and 500 µl of ethanol (Sigma-Aldrich, >99.8). The mixture was ultrasonicated for 30 min to form a homogenous slurry. The slurry was drop-cast onto the glassy carbon electrode (3 mm diameter) and dried under an incandescent bulb lamp for ~10 min. All electrochemical experiments were carried out in 1 M H$_2$SO$_4$ at room temperature using a three-electrodes system, in which a Pt wire and a standard calomel electrode (SCE) were used as the counter and reference electrodes, respectively. Cyclic voltammetry (CV), at scan rates of 100 mV s$^{-1}$, and galvanostatic charge-discharge runs were carried out using a BioLogic VMP3 electrochemical workstation. The specific capacitance was calculated from the CV and discharging curves according to the following equation:

$$C_{sp} = (I \times \Delta t)/(\Delta V \times m) \quad (1)$$

where $C_{sp}$ (F g$^{-1}$) is the specific capacitance of the electrode, I (A) is the discharging current, $\Delta$t (s) is the discharging time, $\Delta$V (V) is the potential and m (g) is the mass of the rGO.

TABLE II

Specific surface areas reported in the literature for rGO using the hydrothermal reduction method. See also FIG. 16.

| Surface area (m$^2$/g) | Reference |
|---|---|
| 102 | J. Solid State Electrochem., 19 (2014), 361. |
| 62 | RSC Adv., 4 (2014), 42412. |
| 31 | Appl. Surf. Science, 358 (2015), 100. |
| 364 | This work |

TABLE III

Electrochemical performance of rGOs reported in the literature.

| Reduction method | Specific capacitance (Fg$^{-1}$) | Reference |
|---|---|---|
| Solvothermal (dried in vacuum) | 276 @ 0.1 Ag$^{-1}$ | J. Phys. Chem. C, 115 (2011), 7120. |
| Thermal | 227 @ 1 Ag$^{-1}$ | Carbon, 50 (2012), 2179. |
| Thermal | 261 @ 0.4 Ag$^{-1}$ | J. Power Sources, 198 (2012), 423. |
| Hydrothermal (dried at 60° C.) | 139 @ 5 Ag$^{-1}$ | J. Mater. Chem., 21 (2011), 3422. |
| Hydrothermal (dried at 60° C. under vacuum) | 90 @ 5 mA cm$^{-2}$ | Russian J. Electrochem., 49 (2013), 359-364. |
| Hydrothermal (dried by CPD) | 441 @ 1 Ag$^{-1}$ | This work |

REFERENCES

1. Zhao, B.; Liu, P.; Jiang, Y.; Pan, D.; Tao, H.; Song, J.; Fang, T.; Xu, W., Supercapacitor performances of thermally reduced graphene oxide. *Journal of Power Sources* 2012, 198, 423-427.
2. Li, D.; Muller, M. B.; Gilje, S.; Kaner, R. B.; Wallace, G. G., Processable aqueous dispersions of graphene nanosheets. *Nat Nano* 2008, 3 (2), 101-105.

3. Shin, H.-J.; Kim, K. K.; Benayad, A.; Yoon, S.-M.; Park, H. K.; Jung, I.-S.; Jin, M. H.; Jeong, H.-K.; Kim, J. M.; Choi, J.-Y.; Lee, Y. H., Efficient Reduction of Graphite Oxide by Sodium Borohydride and Its Effect on Electrical Conductance. *Advanced Functional Materials* 2009, 19 (12), 1987-1992.

4. Wang, X.; Xing, W.; Song, L.; Yang, H.; Hu, Y.; Yeoh, G. H., Fabrication and characterization of graphene-reinforced waterborne polyurethane nanocomposite coatings by the sol-gel method. *Surface and Coatings Technology* 2012, 206 (23), 4778-4784.

5. Schniepp, H. C.; Li, J.-L.; McAllister, M. J.; Sai, H.; Herrera-Alonso, M.; Adamson, D. H.; Prud'homme, R. K.; Car, R.; Saville, D. A.; Aksay, I. A., Functionalized Single Graphene Sheets Derived from Splitting Graphite Oxide. *The Journal of Physical Chemistry B* 2006, 110 (17), 8535-8539.

6. Xiao, Y.; Li, X.; Zai, J.; Wang, K.; Gong, Y.; Li, B.; Han, Q.; Qian, X., CoFe2O4-Graphene Nanocomposites Synthesized through An Ultrasonic Method with Enhanced Performances as Anode Materials for Li-ion Batteries. *Nano-Micro Letters* 2014, 6 (4), 307-315.

7. Song, Z.; Zhang, Y.; Liu, W.; Zhang, S.; Liu, G.; Chen, H.; Qiu, J., Hydrothermal synthesis and electrochemical performance of Co3O4/reduced graphene oxide nanosheet composites for supercapacitors. *Electrochimica Acta* 2013, 112, 120-126.

8. Nassar, M. Y.; Ahmed, I. S., Hydrothermal synthesis of cobalt carbonates using different counter ions: An efficient precursor to nano-sized cobalt oxide (Co3O4). *Polyhedron* 2011, 30 (15), 2431-2437.

9. Ciesielski, W.; Tomasik, P., Thermal properties of complexes of amaranthus starch with selected metal salts. *Thermochim Acta* 2003, 403.

10. Wang, H.; Cui, L.-F.; Yang, Y.; Sanchez Casalongue, H.; Robinson, J. T.; Liang, Y.; Cui, Y.; Dai, H., Mn3O4-Graphene Hybrid as a High-Capacity Anode Material for Lithium Ion Batteries. *Journal of the American Chemical Society* 2010, 132 (40), 13978-13980.

11. Li, Y.; Gao, W.; Ci, L.; Wang, C.; Ajayan, P. M., Catalytic performance of Pt nanoparticles on reduced graphene oxide for methanol electro-oxidation. *Carbon* 2010, 48 (4), 1124-1130.

12. Antony, R. P.; Preethi, L. K.; Gupta, B.; Mathews, T.; Dash, S.; Tyagi, A. K., Efficient electrocatalytic performance of thermally exfoliated reduced graphene oxide-Pt hybrid. *Materials Research Bulletin* 2015, 70, 60-67.

13. Gao, M.; Peh, C. K. N.; Ong, W. L.; Ho, G. W., Green chemistry synthesis of a nanocomposite graphene hydrogel with three-dimensional nano-mesopores for photocatalytic H2 production. *RSC Advances* 2013, 3 (32), 13169-13177.

14. Lin, Z.; Liu, Y.; Yao, Y.; Hildreth, O. J.; Li, Z.; Moon, K.; Wong, C.-p., Superior Capacitance of Functionalized Graphene. *The Journal of Physical Chemistry C* 2011, 115 (14), 7120-7125.

15. Low, Q. X.; Ho, G. W., Facile structural tuning and compositing of iron oxide-graphene anode towards enhanced supacapacitive performance. *Nano Energy* 2014, 5, 28-35.

16. Choi, H.-J.; Jung, S.-M.; Seo, J.-M.; Chang, D. W.; Dai, L.; Baek, J.-B., Graphene for energy conversion and storage in fuel cells and supercapacitors. *Nano Energy* 2012, 1 (4), 534-551.

17. Granadeiro, C. M.; Cruz, S. M. A.; Goncalves, G.; Marques, P. A. A. P.; Costa, P. M. F. J.; Ferreira, R. A. S.; Carlos, L. D.; Nogueira, H. I. S., Photoluminescent bimetallic-3-hydroxypicolinate/graphene oxide nanocomposite. *RSC Advances* 2012, 2 (25), 9443-9447.

18. Ma, X.; Tao, H.; Yang, K.; Feng, L.; Cheng, L.; Shi, X.; Li, Y.; Guo, L.; Liu, Z., A functionalized graphene oxide-iron oxide nanocomposite for magnetically targeted drug delivery, photothermal therapy, and magnetic resonance imaging. *Nano Res.* 2012, 5 (3), 199-212.

19. Zhao, C.; Chou, S.-L.; Wang, Y.; Zhou, C.; Liu, H.-K.; Dou, S.-X., A facile route to synthesize transition metal oxide/reduced graphene oxide composites and their lithium storage performance. *RSC Advances* 2013, 3 (37), 16597-16603.

20. Du, M.; Sun, J.; Chang, J.; Yang, F.; Shi, L.; Gao, L., Synthesis of nitrogen-doped reduced graphene oxide directly from nitrogen-doped graphene oxide as a high-performance lithium ion battery anode. *RSC Advances* 2014, 4 (80), 42412-42417.

21. Vermisoglou, E. C.; Giannakopoulou, T.; Romanos, G.; Giannouri, M.; Boukos, N.; Lei, C.; Lekakou, C.; Trapalis, C., Effect of hydrothermal reaction time and alkaline conditions on the electrochemical properties of reduced graphene oxide. *Applied Surface Science* 2015, 358, Part A, 100-109.

22. Park, S.; An, J.; Potts, J. R.; Velamakanni, A.; Murali, S.; Ruoff, R. S., Hydrazine-reduction of graphite- and graphene oxide. *Carbon* 2011, 49 (9), 3019-3023.

23. Wong, C. P. P.; Lai, C. W.; Lee, K. M.; Hamid, S. B. A., Advanced Chemical Reduction of Reduced Graphene Oxide and Its Photocatalytic Activity in Degrading Reactive Black 5. *Materials* 2015, 8 (10), 7118-7128.

24. Xu, C.; Shi, X.; Ji, A.; Shi, L.; Zhou, C.; Cui, Y., Fabrication and Characteristics of Reduced Graphene Oxide Produced with Different Green Reductants. *PloS one* 2015, 10 (12), e0144842.

25. Zhang, X.; Sui, Z.; Xu, B.; Yue, S.; Luo, Y.; Zhan, W.; Liu, B., Mechanically strong and highly conductive graphene aerogel and its use as electrodes for electrochemical power sources. *Journal of Materials Chemistry* 2011, 21 (18), 6494-6497.

26. Talbot, M. J.; White, R. G., Methanol fixation of plant tissue for Scanning Electron Microscopy improves preservation of tissue morphology and dimensions. *Plant Methods* 2013, 9 (1), 1-7.

27. Dohnalkova, A. C.; Marshall, M. J.; Arey, B. W.; Williams, K. H.; Buck, E. C.; Fredrickson, J. K., Imaging hydrated microbial extracellular polymers: comparative analysis by electron microscopy. *Applied and environmental microbiology* 2011, 77 (4), 1254-1262.

28. Lalwani, G.; Kwaczala, A. T.; Kanakia, S.; Patel, S. C.; Judex, S.; Sitharaman, B., Fabrication and characterization of three-dimensional macroscopic all-carbon scaffolds. *Carbon* 2013, 53, 90-100.

29. Marcano, D. C.; Kosynkin, D. V.; Berlin, J. M.; Sinitskii, A.; Sun, Z.; Slesarev, A.; Alemany, L. B.; Lu, W.; Tour, J. M., Improved Synthesis of Graphene Oxide. *ACS Nano* 2010, 4 (8), 4806-4814.

30. Alazmi, A.; Rasul, S.; Patole, S. P.; Costa, P. M., Comparative study of synthesis and reduction methods for graphene oxide. *Polyhedron Forthcoming* 2016; doi: 10.1016/j.poly.2016.04.044).

31. Luo, Z.; Yang, D.; Qi, G.; Shang, J.; Yang, H.; Wang, Y.; Yuwen, L.; Yu, T.; Huang, W.; Wang, L., Microwave-assisted solvothermal preparation of nitrogen and sulfur co-doped reduced graphene oxide and graphene quantum dots hybrids for highly efficient oxygen reduction. *Journal of Materials Chemistry A* 2014, 2 (48), 20605-20611.

32. Sawangphruk, M.; Suksomboon, M.; Kongsupornsak, K.; Khuntilo, J.; Srimuk, P.; Sanguansak, Y.; Klunbud, P.; Suktha, P.; Chiochan, P., High-performance supercapacitors based on silver nanoparticle-polyaniline-graphene nanocomposites coated on flexible carbon fiber paper. *Journal of Materials Chemistry A* 2013, 1 (34), 9630-9636.

33. Ramimoghadam, D.; Bin Hussein, M. Z.; Taufiq-Yap, Y. H., Hydrothermal synthesis of zinc oxide nanoparticles using rice as soft biotemplate. *Chemistry Central Journal* 2013, 7 (1), 1-10.

34. Hayes, W. I.; Joseph, P.; Mughal, M. Z.; Papakonstantinou, P., Production of reduced graphene oxide via hydrothermal reduction in an aqueous sulphuric acid suspension and its electrochemical behaviour. *Journal of solid state electrochemistry* 2015, 19 (2), 361-380.

35. Feng, X., *Nanocarbons for Advanced Energy Storage*. Wiley: 2015.

36. Yan, J.; Wang, Q.; Wei, T.; Jiang, L.; Zhang, M.; Jing, X.; Fan, Z., Template-Assisted Low Temperature Synthesis of Functionalized Graphene for Ultrahigh Volumetric Performance Supercapacitors. *ACS Nano* 2014, 8 (5), 4720-4729.

37. Kumar, R.; Singh, R. K.; Savu, R.; Dubey, P. K.; Kumar, P.; Moshkalev, S. A., Microwave-assisted synthesis of void-induced graphene-wrapped nickel oxide hybrids for supercapacitor applications. *RSC Advances* 2016, 6 (32), 26612-26620.

38. Yan, J.; Liu, J.; Fan, Z.; Wei, T.; Zhang, L., High-performance supercapacitor electrodes based on highly corrugated graphene sheets. *Carbon* 2012, 50 (6), 2179-2188.

39. Shi, W.; Zhu, J.; Sim, D. H.; Tay, Y. Y.; Lu, Z.; Zhang, X.; Sharma, Y.; Srinivasan, M.; Zhang, H.; Hng, H. H.; Yan, Q., Achieving high specific charge capacitances in Fe3O4/reduced graphene oxide nanocomposites. *Journal of Materials Chemistry* 2011, 21 (10), 3422-3427.

40. He, P.; Yang, K.; Wang, W.; Dong, F.; Du, L.; Deng, Y., Reduced graphene oxide-CoFe2O4 composites for supercapacitor electrode. *Russian Journal of Electrochemistry* 2013, 49 (4), 359-364.

41. Bai, Y.; Rakhi, R. B.; Chen, W.; Alshareef, H. N., Effect of pH-induced chemical modification of hydrothermally reduced graphene oxide on supercapacitor performance. *Journal of Power Sources* 2013, 233, 313-319.

42. Kumar, N. A.; Choi, H.-J.; Shin, Y. R.; Chang, D. W.; Dai, L.; Baek, J.-B., Polyaniline-Grafted Reduced Graphene Oxide for Efficient Electrochemical Supercapacitors. *ACS Nano* 2012, 6 (2), 1715-1723.

43. Lim, H. N.; Huang, N. M.; Lim, S. S.; Harrison, I.; Chia, C. H., Fabrication and characterization of graphene hydrogel via hydrothermal approach as a scaffold for preliminary study of cell growth. *International Journal of Nanomedicine* 2011, 6, 1817-1823.

44. Kumar, N. A.; Gambarelli, S.; Duclairoir, F.; Bidan, G.; Dubois, L., Synthesis of high quality reduced graphene oxide nanosheets free of paramagnetic metallic impurities. *Journal of Materials Chemistry A* 2013, 1 (8), 2789-2794.

Embodiments for Carbon Dioxide Capture

Another application for the compositions and materials (and methods of making them) described herein is carbon dioxide capture. See, in particular, FIGS. 16-19. The effective capture of $CO_2$ emitted by fossil-fuel-based power plants and other large industrial facilities is a top global priority to reduce the impact of global climate change and energy crisis (Chowdhury, S.; Balasubramanian, R., Highly efficient, rapid and selective CO2 capture by thermally treated graphene nanosheets. *Journal of $CO_2$ Utilization* 2016, 13, 50-60). As a result, several adsorbent materials have been studied for separation and storage of $CO_2$ from fuel gases and other industrial exhaust streams. Recently, graphite and graphene have received a great deal of attention for gas adsorption, however, there has been little work carried out on graphene oxide (GO) for gas adsorption (Table IV) (Burress, J. W.; Gadipelli, S.; Ford, J.; Simmons, J. M.; Zhou, W.; Yildirim, T., Graphene Oxide Framework Materials: Theoretical Predictions and Experimental Results. *Angewandte Chemie International Edition* 2010, 49 (47), 8902-8904).

Moreover, while GO with different degrees of oxidation and functionalization have been studied, the characterization of their porosity and/or gas adsorption properties is still overlooked. The most common GO production process is the so-called Hummer's method (or an adaptation of this). Not surprisingly, the few studies that have delved into $CO_2$ capture using GO have been based in GO derived from the Hummer's method without serious concerns on the steps involved. One such step, that is key is the drying methodology used after the GO product is obtained. The reported specific surface area of GO materials are less than or about 100 $m^2 g^{-1}$ (Table V), possibly due to the GO pore network collapse and sheet re-aggregation taking place during the drying step.

In this study, we illustrate that GO can be turned into a potentially relevant gas storage material by using an adapted ("Improved") Hummer's method that results in a material (improved GO, or IGO) with a higher degree of oxidation (A. Alazmi et al., *Polyhedron*, DOI: 10.1016/j.poly.2016.04.044). Depending on the post-synthesis drying method employed, it is possible to partially tune the pore width/volume and specific surface area of the GO material. In line with this, the effect of employing vacuum, freeze and critical point drying (CPD) on the morphology, specific surface area, porosity and gas adsorption properties of IGO can be and has been determined. Our findings demonstrate for the first time that the CPD process can have a positive influence on the characteristic of GO materials, and it represents an effective strategy in the design and development of GO-based solid adsorbents for $CO_2$ capture.

Overall, GO-vacuum dried material and GO-freeze-dried material are exclusively made up of micro-pores in the material. On the other hand, the GO-CPD dried material comprises micro, meso and macro pores. At the range of pressure of 0-1 bar, the micro pores are filled, while the meso and macro pores will only be filled at higher pressures (>10 bar). From the t-plot, the micro pore volume of the GO-CPD is comparable with the micro pore volume of GO-Vacuum and GO-freeze (Table 4). This can explain the comparable CO2-uptake values for GO-vacuum dried, GO-freeze dried, and GO-CPD dried materials.

On the other hand, our observation demonstrated that the GO prepared using Improved-Hummers' method has higher $CO_2$-uptake than the GO prepared using Hummers' method (FIG. 17). The filling of the meso/macro pores of GO-CPD at higher pressure (>10 bar) can improve the $CO_2$-uptake value of these materials.

TABLE IV

Comparison of $CO_2$ adsorption by GO

| Adsorbent | Synthesis method | Drying method | Porosity | Temperature (K) | $CO_2$ Uptake at 1 bar (mmol/g) | References |
|---|---|---|---|---|---|---|
| GO | GO by modified Hummers' method | at 60° C. | Micropores | 273 | 0.17 | International journal of hydrogen energy 39 (2014) 11047-11054 |
| GO | GO by modified Hummers' method | Under vacuum at 50° C. | Micropores | 273 | 0.93 | Xuetal. NanoscaleResearchLetters (2015) 10: 318 |
| GO | GO by improved Hummers' | CPD | Micro/macropores | 273 | 1.8 | Our work |

TABLE V

Comparison of specific surface area of GO

| Synthesis method | Starting material | Drying method | BET surface area ($m^2/g$) | References |
|---|---|---|---|---|
| GO | GO by Hummers' method | In vacuum | 68.3 | CARBON 50 (2012) 3724-3730 |
| GO from porous graphite (355 $m^2/g$)+ | GO by Hummers' method | In vacuum | 161 | Adv. Funct. Mater. 2010, 20, 1670-1679 |
| GO from graphite (14.36 $m^2/g$) | GO by modified Hummer's | freeze-dried | 102.29 | Journal of Solid State Electrochemistry, 2014. 19(2): p. 361-380 |
| GO | GO by modified Staudenmaier's method [ | Dried at room temperature | 5.7 | E. C. Vermisoglou et al./Applied Surface Science 358 (2015) 100-109 |

What is claimed is:

1. A composition comprising:
reduced graphene oxide, which is obtained by critical point drying with a fluid, at a critical point of the fluid, wherein the critical point dried reduced graphene oxide is mesoporous and has a specific surface area of at least 364 $m^2/g$,
wherein the critical point dried reduced graphene oxide has a specific capacitance larger than 300 F/g, and
wherein the composition does not include an aerogel material.

2. The composition of claim 1, wherein the reduced graphene oxide has micropores and mesopores.

3. The composition of claim 1, wherein the reduced graphene oxide, when dried to a powder material with a critical point dryer, shows a predominance of mesopores over micropores and macropores.

4. The composition of claim 3, where the predominance of mesopores results in the improvement of the specific capacitance and/or a gas adsorption capability for the reduced graphene oxide.

5. A composition prepared by a method comprising:
critical point drying of a reduced graphene oxide material with a fluid at a critical point of the fluid to produce a dried reduced graphene oxide material,
wherein the critical point drying is performed with a critical point dryer having a sample holder comprising metal mesh, the metal mesh having pores having a pore width of 500 microns or less, so that a total pore volume of the reduced graphene oxide is 1.17 $cm^3$ $g^{-1}$, and
wherein the dried reduced graphene oxide material has a specific capacitance larger than 300 F/g.

6. The composition of claim 5, wherein the metal mesh having pores has a pore width of 50 microns to 250 microns.

7. The composition of claim 5, wherein the reduced graphene oxide has a specific surface area of at least 364 $m^2/g$.

8. The composition of claim 5, wherein the reduced graphene oxide has micropores and mesopores.

9. The composition of claim 5, wherein the reduced graphene oxide, when dried to a powder material with a critical point dryer, shows a predominance of mesopores over micropores and macropores.

10. The composition of claim 9, where the predominance of mesopores results in the improvement of a specific capacitance and/or a gas adsorption capability for the reduced graphene oxide.

11. The composition of claim 5, wherein the method of preparing the composition further comprises:
hydrothermally reducing a graphene oxide to obtain the reduced graphene oxide.

12. The composition of claim 11, wherein the method of preparing the composition further comprises:
performing additional critical point drying to the hydrothermally reduced graphene oxide.

13. A method comprising:
critical point drying reduced graphene oxide material with use of a fluid at a critical point, in a critical point dryer, to produce a dried reduced graphene oxide material,
wherein the critical point dryer is used with a sample holder comprising a metal mesh,
wherein the dried reduced graphene oxide material has a specific capacitance larger than 300 F/g, and
wherein the dried reduced graphene oxide material does not include an aerogel material.

14. The method of claim 13, further comprising:
hydrothermally reducing a graphene oxide to obtain the reduced graphene oxide.

15. The method of claim 14, further comprising:
performing additional critical point drying to the hydrothermally reduced graphene oxide.

16. The method of claim 13, wherein the metal mesh has pores with a pore width of 500 microns or less.

17. The method of claim 13, wherein the metal mesh is stainless steel mesh.

18. The method of claim 17, wherein the sample holder comprises walls of a fluorinated polymer.

19. The method of claim 18, wherein the sample holder comprises walls of polytetrafluoroethylene.

20. The method of claim 13, wherein after the critical point drying, the reduced graphene oxide has a specific surface area of at least 364 $m^2/g$.

* * * * *